(12) United States Patent
Niazi et al.

(10) Patent No.: US 12,526,526 B1
(45) Date of Patent: Jan. 13, 2026

(54) IMAGE COMPOSITING WITH ADJACENT LOW PARALLAX CAMERAS

(71) Applicant: Circle Optics, Inc., Rochester, NY (US)

(72) Inventors: Zakariya Niazi, Rochester, NY (US); Andrew F. Kurtz, Rochester, NY (US); Peter O. Stubler, Rochester, NY (US); Steven Fuller, Durham, NC (US)

(73) Assignee: Circle Optics, Inc., Rochester, NY (US)

( * ) Notice: Subject to any disclaimer, the term of this patent is extended or adjusted under 35 U.S.C. 154(b) by 0 days.

(21) Appl. No.: 19/022,859

(22) Filed: Jan. 15, 2025

Related U.S. Application Data

(63) Continuation of application No. PCT/US2024/037872, filed on Jul. 12, 2024, and a continuation-in-part of application No. 18/771,629, filed on Jul. 12, 2024.

(51) Int. Cl.
*H04N 23/698* (2023.01)
*G06T 3/18* (2024.01)

(52) U.S. Cl.
CPC ............. *H04N 23/698* (2023.01); *G06T 3/18* (2024.01)

(58) Field of Classification Search
CPC .................................................... H04N 23/698
USPC ............................................................ 348/38
See application file for complete search history.

(56) References Cited

U.S. PATENT DOCUMENTS

| | | |
|---|---|---|
| 3,524,697 A | 8/1970 | Masaki et al. |
| 5,703,604 A | 12/1997 | McCutchen |
| 9,294,672 B2 | 3/2016 | Georgiev et al. |
| 9,792,709 B1 | 10/2017 | Meler |
| 9,838,614 B1 | 12/2017 | Brailovskiy et al. |
| 10,341,559 B2 | 7/2019 | Niazi |
| 2014/0104378 A1 | 4/2014 | Kauff et al. |
| 2016/0307372 A1 | 10/2016 | Pitts et al. |
| 2016/0352982 A1 | 12/2016 | Weaver et al. |
| 2018/0376061 A1 | 12/2018 | Alvarado-Moya et al. |
| 2019/0370949 A1 | 12/2019 | Hutchinson et al. |
| 2020/0336631 A1 | 10/2020 | Biasini et al. |
| 2021/0089040 A1 | 3/2021 | Ebrahimi Afrouzi et al. |
| 2021/0166354 A1 | 6/2021 | Veit et al. |

(Continued)

FOREIGN PATENT DOCUMENTS

| | | |
|---|---|---|
| WO | WO2018193713 A1 | 10/2018 |
| WO | WO2020263867 A1 | 12/2020 |

OTHER PUBLICATIONS

Kurtz et al., "Visor Type Camera Array Systems" International Application No. PCT/US2024/037826, filed Jul. 12, 2024.

(Continued)

*Primary Examiner* — Amir Shahnami
(74) *Attorney, Agent, or Firm* — Lee & Hayes, P.C.

(57) ABSTRACT

A multi-camera imaging system includes a plurality of imaging units arranged side-by-side to capture images of a scene. A calibration module is configured to determine intrinsic and extrinsic parameters of camera modules of the imaging units and to establish a per-pixel mapping from image coordinates to a three-dimensional space. An image processing module selects, for individual of the plurality of imaging units, a field-of-view region within a captured image and blends the fields-of-view from adjacent imaging units together to form a composite image.

20 Claims, 17 Drawing Sheets

(56) References Cited

U.S. PATENT DOCUMENTS

| | | |
|---|---|---|
| 2021/0352192 A1 | 11/2021 | Sharma et al. |
| 2022/0357645 A1 | 11/2022 | Sisto et al. |
| 2022/0357646 A1 | 11/2022 | Kurtz et al. |
| 2023/0090281 A1* | 3/2023 | Kurtz ................ G02B 13/0095 359/725 |
| 2024/0273753 A1 | 8/2024 | Shaag et al. |
| 2025/0022103 A1 | 1/2025 | Niazi |

OTHER PUBLICATIONS

Search Report and Written Opinion for International Application No. PCT/US2025/011731, Dated May 9, 2025, 11 pages.
Search Report and Written Opinion for International Application No. PCT/US24/37872, Dated Jul. 14, 2025, 20 pages.

\* cited by examiner

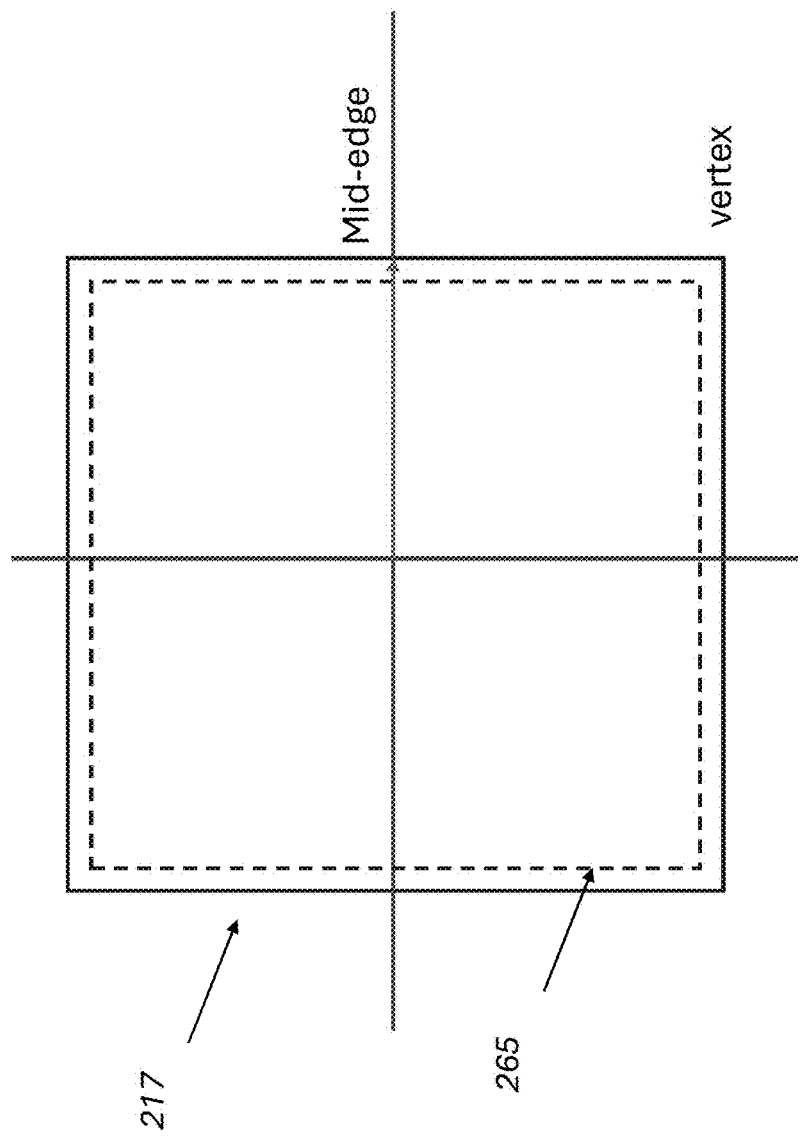

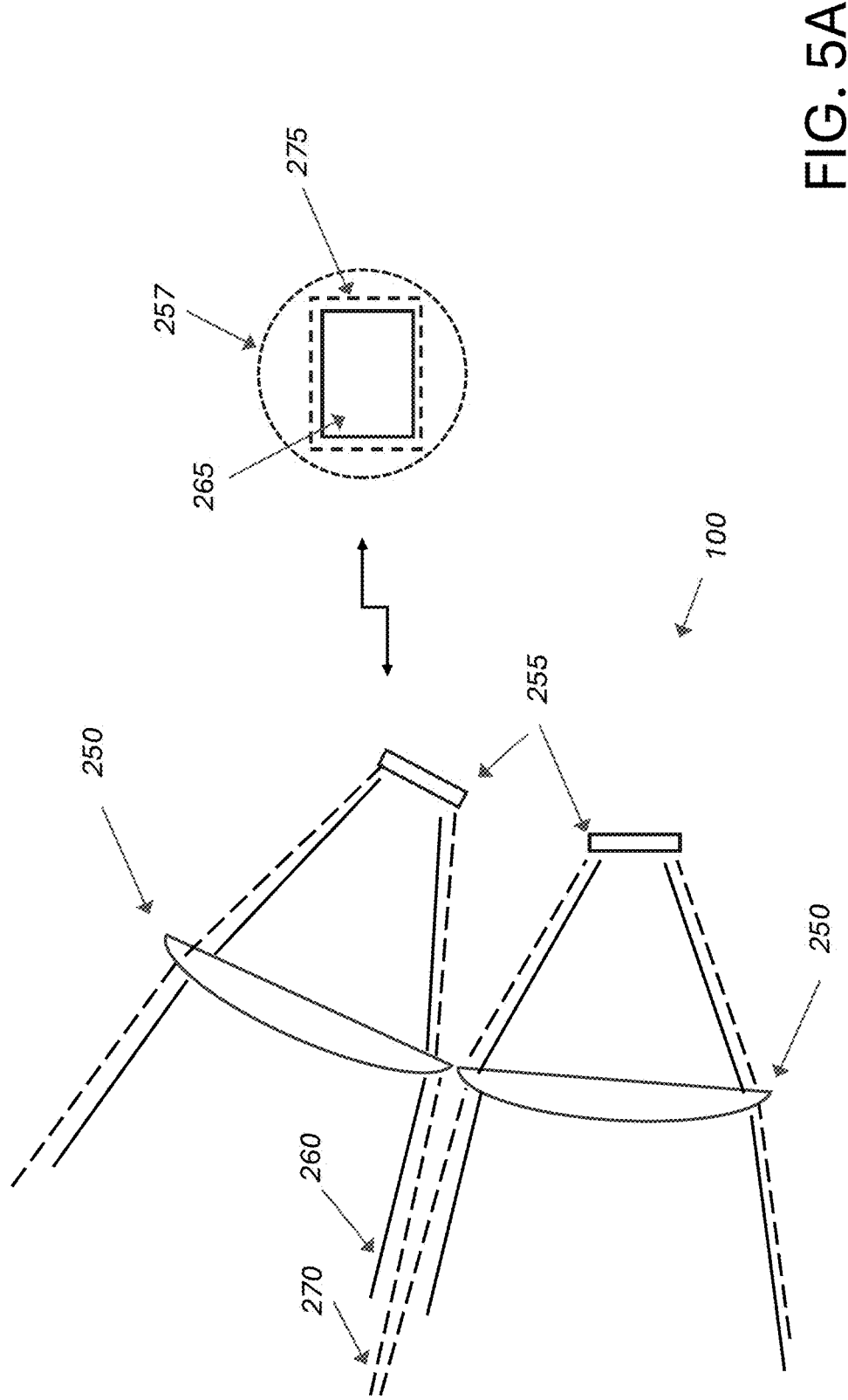

450

FOR A LOCATION IN AN OVERLAP REGION, DETERMINE ANGLE CHARACTERISTICS FOR EACH CAMERA CHANNEL CONTRIBUTING DATA TO THE LOCATION
452

DETERMINE DISTANCE OF LOCATION TO A BISECTING PLANE, AND AVERAGE AND DIFFERENCE OF THE ANGLE CHARACTERISTICS
454

DETERMINE QUADRANT PARAMETERS BASED ON THE SIGN OF THE DISTANCE AND SIGN OF THE DIFFERENCE
456

DETERMINE AN ESTIMATED DISTANCE TO THE EDGE OF THE OVERLAP REGION FOR EACH CAMERA CHANNEL
458

DETERMINE WEIGHTS CORRESPONDING TO EACH CAMERA CHANNEL BASED ON DISTANCE TO THE EDGE OF THE OVERLAP REGION
460

FIG. 8C

IMAGE COMPOSITING WITH ADJACENT LOW PARALLAX CAMERAS

CROSS REFERENCE TO RELATED APPLICATIONS

This application is a continuation-in-part of and claims benefit of priority of U.S. patent application Ser. No. 18/771,629, filed Jul. 12, 2024, entitled "Image Rendering for Adjacent Low Parallax Cameras," the entirety of which is incorporated herein by reference. This disclosure also claims benefit of priority from PCT/US24/37826, filed Jul. 12, 2024, entitled "Visor Type Camera Array Systems," the entirety of which is incorporated herein by reference. Both of the foregoing applications claim benefit of priority of: U.S. Provisional Patent Application Ser. No. 63/513,707, entitled "Image Compositing with Adjacent Low Parallax Cameras," and U.S. Provisional Patent Application Ser. No. 63/513,721 entitled "Visor Type Camera Array Systems," both of which were filed on Jul. 14, 2023, and the entirety of each of which is incorporated herein by reference.

DISCLOSURE

This invention was made with U.S. Government support under grant number 2136737 awarded by the National Science Foundation. The Government has certain rights to this invention.

TECHNICAL FIELD

The present disclosure relates to panoramic multi-camera image capture devices having a plurality of adjacent, aligned cameras that produce aggregate low-parallax images by using techniques for processing images generated by the individual cameras within such device. The disclosure particularly relates to the methods and systems for calibrating, tiling, and blending the individual images and an aggregated panoramic image.

BACKGROUND

Panoramic cameras have substantial value because of their ability to simultaneously capture wide field of view images. The earliest such example is the fisheye lens, which is an ultra-wide-angle lens that produces strong visual distortion while capturing a wide panoramic or hemispherical image. While the field of view (FOV) of a fisheye lens is usually between 100 and 180 degrees, the approach has been extended to yet larger angles, including into the 220-270° range, as provided by Y. Shimizu in U.S. Pat. No. 3,524,697.

Panoramic images may also be acquired by capturing image content with multiple cameras, and then rendering the images to aggregate them into a composite image. Most commonly, multiple cameras are arranged with significant physical gaps between them, which may cause blind regions. To compensate, the FOVs captured by adjacent cameras have significant FOV overlap. However, the use of image stitching to render composite panoramic images is computationally intensive, slow (not real-time), and may suffer image artifacts in the overlap regions due to significant parallax differences between adjacent cameras. For example, commonly assigned U.S. Pat. No. 10,341,559 by Z. Niazi provides a multi-camera system in which a plurality of adjacent cameras, optically designed for low parallax imaging, are assembled together in proximity along parallel truncated lens edges to form a camera array. In this type of system, captured images may be rendered in real-time to produce composite wide field of view (WFOV) panoramic images. As another example, U.S. Pat. No. 9,294,672, by T. Georgiev et al., provides a system with reduced parallax in which a plurality of conventional cameras are combined with fold mirrors or prisms to produce an aggregated composite or panoramic image. In this type of system, the use of external fold optics increases the system size and limits the camera array system configurations, and without a deliberate low-parallax lens design, residual image artifacts may still occur at wider fields of view.

Thus, there remain opportunities to improve the generation of low-parallax composite images captured by camera arrays. In particular, the development of improved and optimized image calibration and rendering techniques may both improve various aspects of output image quality for viewing and/or for analytical applications and reduce the image processing time, which may facilitate the real-time output of tiled composite panoramic images.

BRIEF DESCRIPTION OF DRAWINGS

The detailed description is described with reference to the accompanying figures. The same reference numbers in different figures indicate similar or identical items.

FIG. 3A depicts an image sensor.

FIGS. 5A-D depict simplified views of two adjacent cameras, and field of view mapping to the image sensors and back to object space.

FIG. 8C depicts an example process for determining weights corresponding to data from different camera channels.

DETAILED DESCRIPTION

In typical use, a camera images an environment and objects therein (e.g., a scene). If the camera is moved to a different nearby location and used to capture another image of part of that same scene, both the apparent perspectives and relative positioning of the objects will change. In the latter case, one object may now partially occlude another, while a previously hidden object becomes at least partially visible. These differences in the apparent position or direction of an object are known as parallax. Parallax is the apparent displacement or difference in the apparent position of an object viewed along two different lines of sight and is measured by the angle or semi-angle of inclination between those two lines. In a panoramic image capture application, parallax differences may be regarded as an error that may complicate both image stitching and appearance, causing visual disparities, image artifacts, exposure differences, and other errors. Although the resulting images may often be successfully stitched together with image processing algorithms, the input image errors complicate and lengthen image processing time, while sometimes leaving visually obvious residual errors.

Panoramic camera images have been created by a variety of approaches. As an example, in February 2021, the Mars rover Perseverance, used a classical approach, in which a camera was physically rotated to capture 142 individual images over a 360-degree sweep, after which the images were stitched together to create a panoramic composite. For image capture of near objects, this method provides superior results when the camera rotates about its entrance pupil, which is a point on the optical axis of a lens, about which the lens may be rotated without appearing to change perspective. As another example, systems such as the Insta360, which has multiple spatially offset cameras arrayed about a sphere, have been used to capture panoramic images. The individual cameras have significant field of view (FOV) overlap to compensate for the gaps or blind regions between offset cameras. When these images are stitched together to create a panoramic composite, the parallax differences in the overlapping fields of view complicate image stitching and create image artifacts. As a result, such image stitching may be very time consuming and require manual intervention.

Figure 1A:
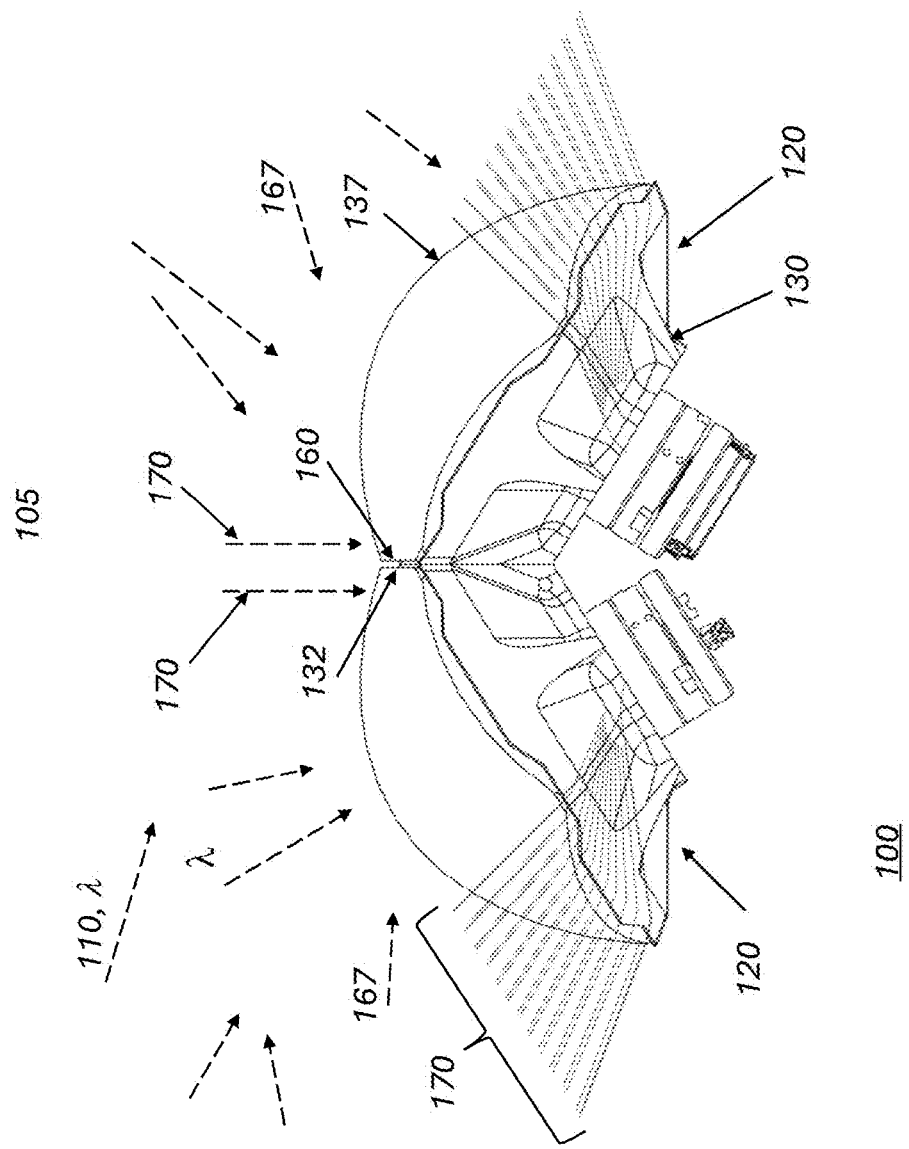
FIG. 1A and FIG. 1B depict a cross-sectional view of a portion of a multi-camera capture device using low-parallax cameras. These diagrams illustrate how entrance pupils can be positioned closely together to minimize parallax at the boundaries of adjacent imaging channels.

In contrast, commonly assigned U.S. Pat. No. 10,341,559 by Z. Niazi provides a multi-camera system where the cameras are optically designed to reduce parallax. Niazi teaches how to design cameras where multiple cameras can be arrayed together to share a common center of perspective, referred to in the application as the No-Parallax point, thereby enabling the lenses to share a common point of view to improve the real-time assembly of the images into panoramic composites. FIG. 1A depicts a portion of an improved integrated panoramic multi-camera capture device 100 having low parallax cameras 120 of the type enabled in the aforementioned patent. For example, these two cameras 120 can be part of a larger multi-camera device 100 with 11 cameras arranged in dodecahedral configuration. The figure illustrates two adjacent cameras 120A, 120B (collectively, the cameras 120) in lens barrels or housings 130 which are designed for reduced-parallax image capture. The illustrated lens housings are tapered to reside within a conical or frustum shape, with mounting features provided at least near the device center. Adjacent outer lens elements 137 of the cameras 120 have adjacent truncated or beveled edges 132 and are proximately located, one camera channel to another, but which may not be in contact, and thus can may be separated by a mechanical gap or physical seam 160 of finite width. An optical gap, which accounts for the beveled edges 132, is larger yet. The physical seams 160 between adjacent camera channels 120 or the adjacent outer lens elements 137, or compressor lens elements, may be measured in various ways: as an actual physical distance between adjacent lens elements or lens housings, as an angular extent of lost FOV, or as a number of "lost" pixels. However, the optical gap, as the distance between outer chief rays of one camera to another may be larger yet, due to any gaps in light acceptance caused by vignetting or coating limits. For example, anti-reflection (AR) coatings are not typically deposited to the edges of optics, but an offsetting margin is provided, to provide a coated clear aperture (CA). Some portion of available light ($\lambda$), or light rays 110, from a scene on the long conjugate side of the lens, or in object space 105, will enter a camera 120A, 120B to become image light that was captured within a constrained field-of-view (FOV) and directed to an image plane. The imaged FOV may be defined as including a substantial Core FOV, that represents the nominal image FOV for the application, and a smaller perimeter or edge FOV beyond the Core FOV, or extended FOV (XFOV), that provides both leeway for mechanical alignment tolerances and a small FOV overlap between adjacent cameras that supports image calibration and image blending. FIG. 1A also depicts a fan of principal or chief rays 170, incident along or near the beveled edges 132 of the lens perimeter, which span an angles of incidence from mid-edge to vertex of ~31-37 degrees. In such as case, the Core FOV can extend out to a range of 31-37 degrees, and the XFOV is then typically 0.5-1 degrees of perimeter FOV margin, although it can be larger (e.g., in the 1-2 degrees range). In telescopic systems, an XFOV will typically be smaller, e.g., ≤0.2 degrees.

In comparison to the device 100 of FIG. 1A, in a typical commercially available panoramic multi-camera system (e.g., an Insta360) using standard lenses, the seams between cameras are outright gaps that can be 30-50 mm wide, or more, depending on the size of the cameras. In particular, such a panoramic camera can have adjacent cameras or camera channels separated by large gaps or seams, between which there are blind spots or regions from which neither camera can capture images.

When designing a lens system for an improved low-parallax multi-camera panoramic capture device (such as the device 100), there are several factors that affect performance (including, particularly parallax) and several parameters that may be individually or collectively optimized, so as to control performance. One approach for parallax control during lens optimization targets the "NP" point, or more significantly, variants thereof. As background, in the field of optics, there is a concept of the entrance pupil, which is a projected image of the aperture stop as seen from object space, or a virtual aperture which the imaged light rays from object space appear to propagate towards before any refraction by the first lens element. By standard practice, the location of the entrance pupil may be found by identifying a paraxial chief ray from object space 105, that transits through the center of the aperture stop, and projecting or extending its object space direction forward to the location where it hits the optical axis of the camera 120. In optics, incident Gauss region or paraxial rays are generally understood to reside within an angular range less than or equal to 10° from the optical axis, and correspond to rays that are directed towards the center of the aperture stop, and which, when projected from the front lens element, also define the paraxial entrance pupil position. Depending on the properties of the lenses pre aperture stop, the entrance pupil diameter may be bigger or smaller than the aperture stop, and located in front of, or behind, the aperture stop.

By comparison, in the field of low-parallax cameras, there is a concept of a no-parallax (NP) point, or viewpoint center. Conceptually, an NP point associated with the paraxial entrance pupil may be helpful in developing initial specifications for designing the lens, and for describing the lens. Whereas an NP point associated with non-paraxial edge of field chief rays may be useful in targeting and understanding parallax performance and in defining the conical volume or frustum that the lens assembly can reside in. The projection of chief rays, and particularly non-paraxial chief rays may miss the paraxial chief ray defined entrance pupil because of both lens aberrations and practical geometry related factors associated with these lens systems, the principal cause being pupil spherical aberration (PSA).

In designing a low-parallax multi-camera imaging system (100), one encounters a geometric limitation: the entrance pupils (Eps) of multiple imaging units cannot be perfectly co-located without causing physical overlap of the imaging unit, and achieving zero separation would imply that multiple camera modules occupy the same physical space. Instead, an optical design strategy focuses on controlling the chief ray paths (and thus the principal rays or IFOV direction vectors) so that the sets of principal rays from adjacent imaging channels become nearly parallel and positioned as close together as mechanically feasible. It is also noted that in designing low-parallax cameras, there may be residual parallax or perspective differences or errors, which vary with field angle, and which can increase as lenses are designed to image yet larger FOVs. Chief ray light paths near the optical axis (paraxial) compared to those near the FOV edges, can vary the most from each other. Though these differences, sometimes referred to as the low-parallax (LP) smudge, may be measured in image space, as causing sub-pixel errors, and thus be practically invisible for many applications. Through careful optical optimization that manages pupil spherical aberration and other pertinent aberrations, and the opto-mechanical design, in some systems, the chief rays can be arranged to appear as though the entrance pupils are effectively "touching" one another along their circumferences. This outcome may be more attainable for small focal length lens systems.

FIG. 1B again depicts two adjacent low-parallax cameras 120, having front lens elements that are truncated, each camera with chief rays 170 projected toward a small entrance pupil 150, of a width 155 that may correspond to a low-parallax volume (the NP point or LP smudge). The figure highlights that the entrance pupils 150 may not be co-located without overlapping physically. Instead, the principal rays 170 from each camera's boundary pixels are shown as nearly parallel and can be nearly or just touching at their boundaries. When the entrance pupil diameter is small, it may be possible to place multiple entrance pupils extremely close together, approaching a limiting scenario where their centers of perspective differ by only a fraction of a millimeter. For wide-angle, 360-degree imaging systems, of the type of FIGS. 1A, such as those constructed with a dodecahedral geometry and employing short focal length optics (e.g., ~2.5 mm), the entrance pupils can be packaged into a roughly spherical configuration. In this example, with an entrance pupil diameter of about 3 mm, the pupils might be arranged within a sphere of approximately 3 mm radius. Achieving this high-density packing typically entails positioning the entrance pupils behind the imaging plane, ensuring they occupy as little volume as possible, and/or minimizing parallax.

It is also noted that low-parallax cameras 120 can be developed to a variety of system or optical specifications. For example, commonly assigned patent application US20220357646 provides a design approach where the outer compressor lens elements 137 are formed into a faceted outer optical dome, so as to reduce the optical and mechanical width of the seams 160. In a faceted dome or short focal length lens example, the entrance pupils 150 can be located closer to the center of the overall multi-camera device 100, and even touch one another along their circumferences at the limit where the seam width goes to zero, further reducing the effective residual parallax differences between adjacent cameras 120. Such a system can again have a dodecahedral configuration.

In contrast, and as another example, commonly assigned patent application PCT/US24/37826 describes a visor type multi-camera system which uses longer focal length, low-parallax lenses to image objects at greater distances in the environment or scene. As an example, to support higher resolution imaging, the maximum FOV of individual cameras, from mid edge to vertex can span an angular range of 15-21 degrees. In such systems, the width of the gap or seam 160 can be larger as compared to the systems shown in FIGS. 1A and 1B, but still small relative to the resolution at the distant objects. Even so, the LP smudge volume can be small, and the residual parallax or perspective differences can still have sub-pixel impact at the image plane. In such systems, the optimized entrance pupil 150 or LP smudge position can move forward, be proximate to, and/or on either side, of the image plane.

Figure 2A:
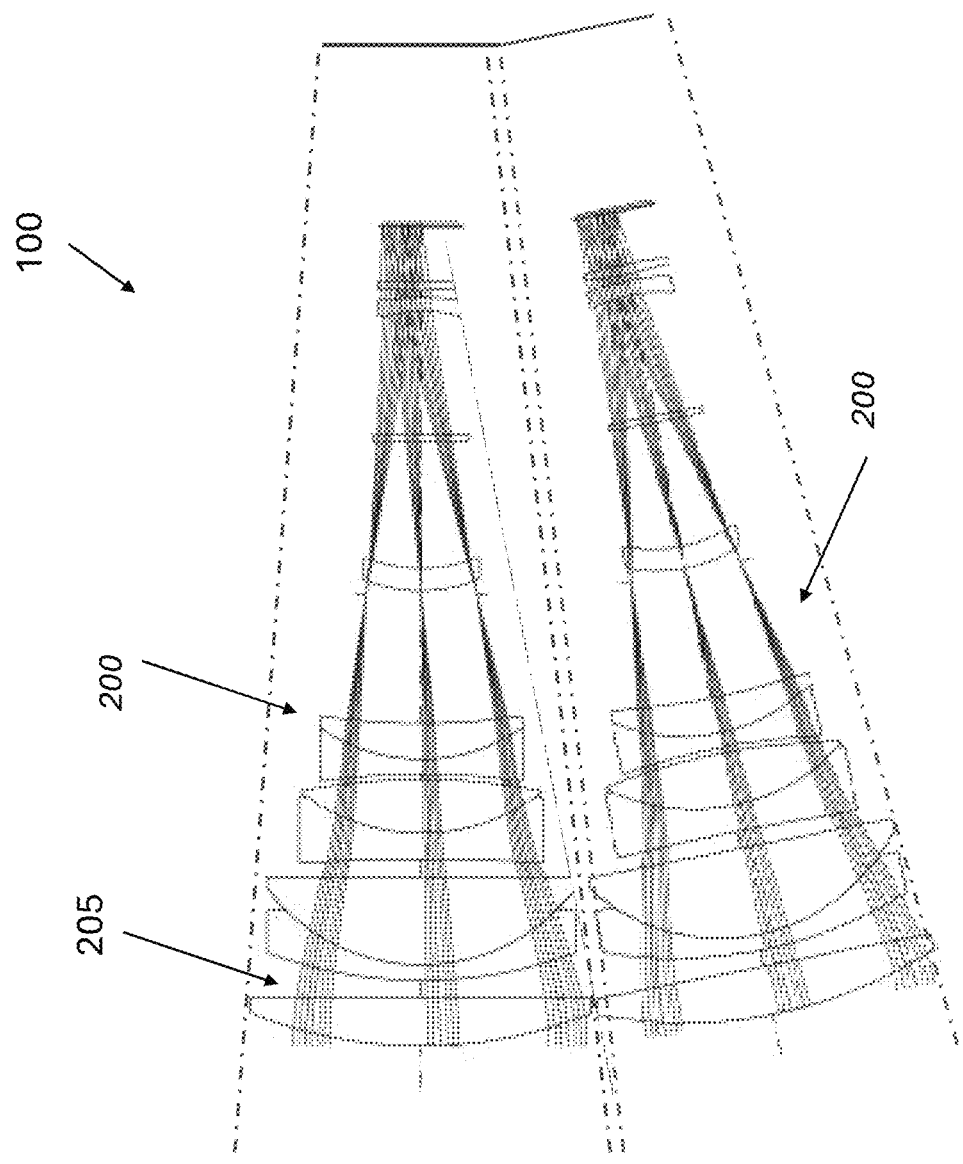
FIG. 2A depicts a cross-sectional view of a portion of a multi-camera capture device using telescopic optics.
Figure 2B:
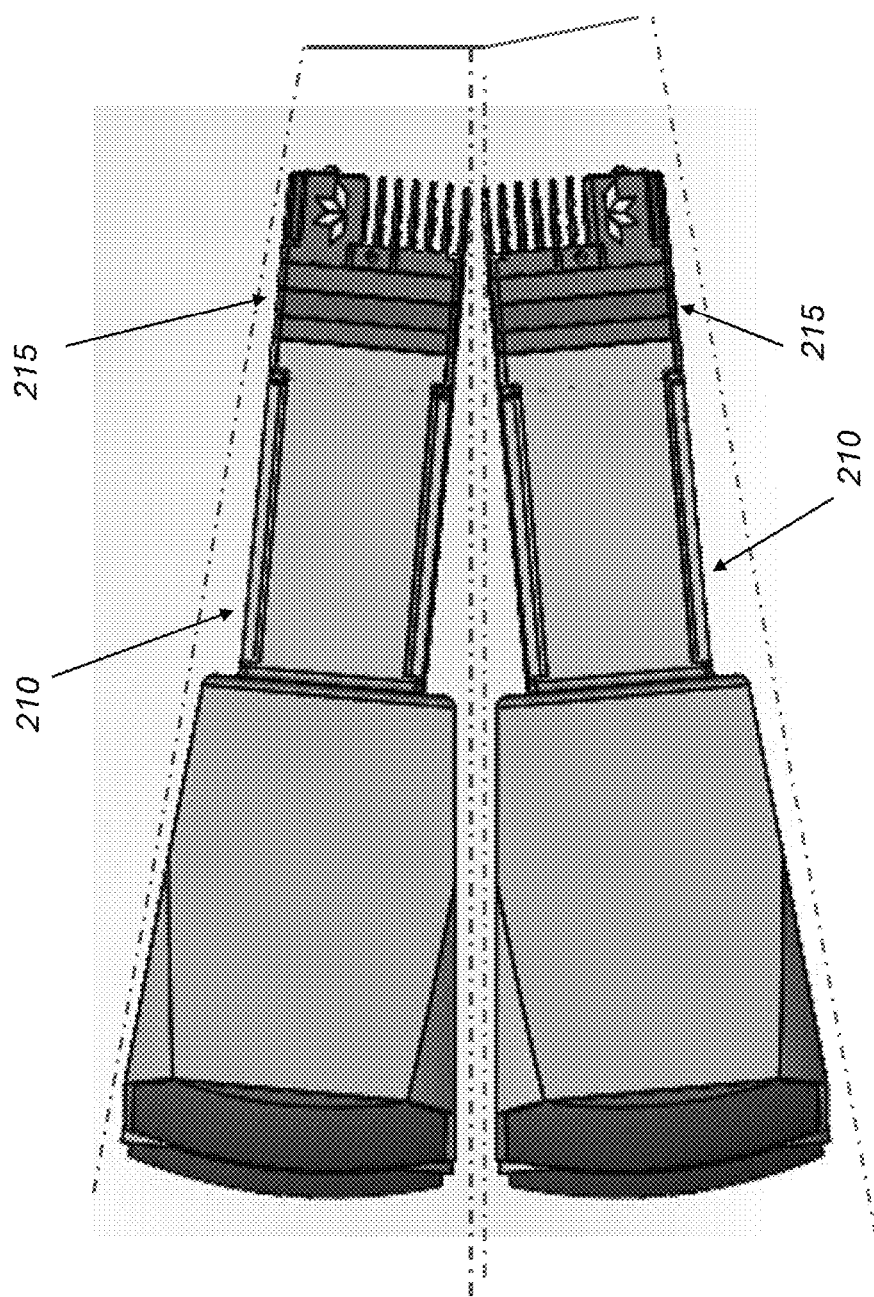
FIG. 2B depicts a side view of a portion of a multi-camera capture device using telescopic cameras with larger entrance pupils.

As a further comparison, as the lens effective focal length (EFL) increases further, and the camera magnification and imaging resolution can increase, the camera FOV decreases, and the camera channels become more telescopic. FIG. 2A depicts a telescopic lens design 200, in which the lens elements reside within a tapered conical or frustum shape. FIG. 2B depicts a conceptual sketch of a portion of an integrated array system with multiple telescopes, within lens housings 210, and with rear image sensor modules 215, arranged side-by-side. Such lenses can have maximum FOVs that fall in the paraxial range (e.g., ≤10 degrees). For such lenses, the entrance pupils are larger and are typically designed to be in front of their respective imaging planes, and even near the front lens elements 205, while typically having a size or diameter approximately the size of that front lens element. FIG. 3A the depicts an image sensor 217 viewed straight on, with a nominal Core FOV 265 therein.

These commonly assigned low-parallax lens design approaches aim to optically and opto-mechanically position entrance pupils in close proximity to reduce parallax at the boundaries between adjacent cameras. However, for certain other applications that involve high magnification optics and long-range imaging (e.g., telescopic), where each camera's maximum FOV is sufficiently narrow—often referred to as the paraxial regime (e.g., ≤10 degrees)—it may not be necessary or advantageous to place the entrance pupils in close proximity. Instead, with respect to the present invention, it is noted that conventional telescopic cameras may be used, and positioned to remain physically spaced apart without causing appreciable parallax errors, provided the system is configured and calibrated so that each camera's core rectangular or square FOV is optically aligned in parallel with an adjacent camera's core FOV. By providing this approach, the boundary between two adjacent core FOVs can become effectively seamless and free of parallax, even though the entrance pupils may be not co-located behind the image plane. As will be subsequently discussed, the present application will further describe an image blending method that may be advantageously used with such cameras.

This approach differs fundamentally from typical wide-area motion imagery (WAMI) or large-FOV multi-telescope arrays. In many conventional WAMI deployments, each camera channel uses standard optics, with large intervening seams. Image data from each of the cameras may be processed separately and only loosely stitched—leading to large parallax artifacts—or the systems rely on expensive post-processing with computationally intensive stitching—to mitigate perspective misalignment. While such systems may still produce near- or effectively parallax-free panoramic imagery, the stitching of high-magnification images remains computationally expensive and prone to perspective errors. For instance, wide area motion imagery (WAMI) systems frequently employ extensive overlap to stitch multiple telescopic views, as described in *Georegistration of Multiple-Camera Wide Area Motion Imagery* (M. D. Pritt and K. J. LaTourette), which aligns imagery to a digital elevation model by establishing 3D-to-2D tie points. While such techniques may successfully georegister multi-camera imagery, the process may be time intensive, requires expensive compute resources, and will still introduce alignment artifacts when merging scenes with differing viewpoints. Consequently, an opportunity remains to improve panoramic image stitching or blending for integrated multi-telescopic camera systems, addressing both real-time performance and the reduction of parallax errors.

In contrast, the disclosed system and method reduce or eliminate this reliance on costly stitching by (1) carefully defining a parallel core FOV for each camera, (2) performing a rigorous factory (or in-field) calibration that maps every pixel to a 3D direction vector, and/or (3) applying an optimized image blending method. By employing the calibration procedures, described in further detail below, to establish a "core FOV" that is parallel and contiguous with the adjacent camera's "core FOV," the system and method can ensure that, at these seam edges, there is negligible visual mismatch. Any residual parallax may be mitigated by the minimal angle discrepancy and the precise per-pixel 3D mapping performed during calibration. Hence, even with the lens modules spaced apart, the actual composited images may effectively be parallax-free within each camera-to-adjacent-camera seam. In greater detail, as shown in FIGS. 2A and 2B, multiple telescopic cameras, may be arranged into an integrated multi-camera array or device 100, likely with a visor or conical configuration. In this type of system, the outer lens elements are typically circular, rather than having truncated polygonal lens edges. But the telescopic cameras may be assembled into an array with the imaged FOVs, as typically defined by the shape of square or rectangular image sensors, aligned to be nominally parallel to each other. The tolerances or deviations from parallelism are a contributing reason to providing a design with an XFOV.

FIGS. 2A and 2B depict lens systems and cameras using refractive optics. But such systems may be catadioptric, using both refractive and reflective optics. Such systems may also be reflective, using entirely or predominantly reflective optics. However, as such systems have multiple optical folds, integration of telescopic cameras into arrays can be mechanically difficult. For example, in such a system, the maximum FOV at the image vertices is may be ≤10°. However, this is not a hard boundary. For example, a multi-camera system could use cameras that image a maximum FOV at the vertices of 11.7°, while the maximum imaged FOV at the mid-edge is 9.3°. The present application provides improved image blending methods that can be applied to integrated multi-camera systems with optics that capture images at least within or near paraxial or Gauss region FOVs.

Minimum Entrance Pupil Separation

Alternately, a low-parallax, small FOV lens design for telescopic imaging may still be applied to shift the entrance pupil rearwards, proximate or behind the image plane, and thus enable smaller seam widths between adjacent cameras. In an integrated multi-camera array system 100, this can be advantageous in providing a more accurate and robust mechanical design to support adjacent cameras. In these cases, with low-parallax cameras, or small FOV cameras, or telescopic cameras, the amount of residual parallax versus field can be calculated or modeled, and that data used to inform image calibration, image stitching, or image blending processes.

Figure 1B:
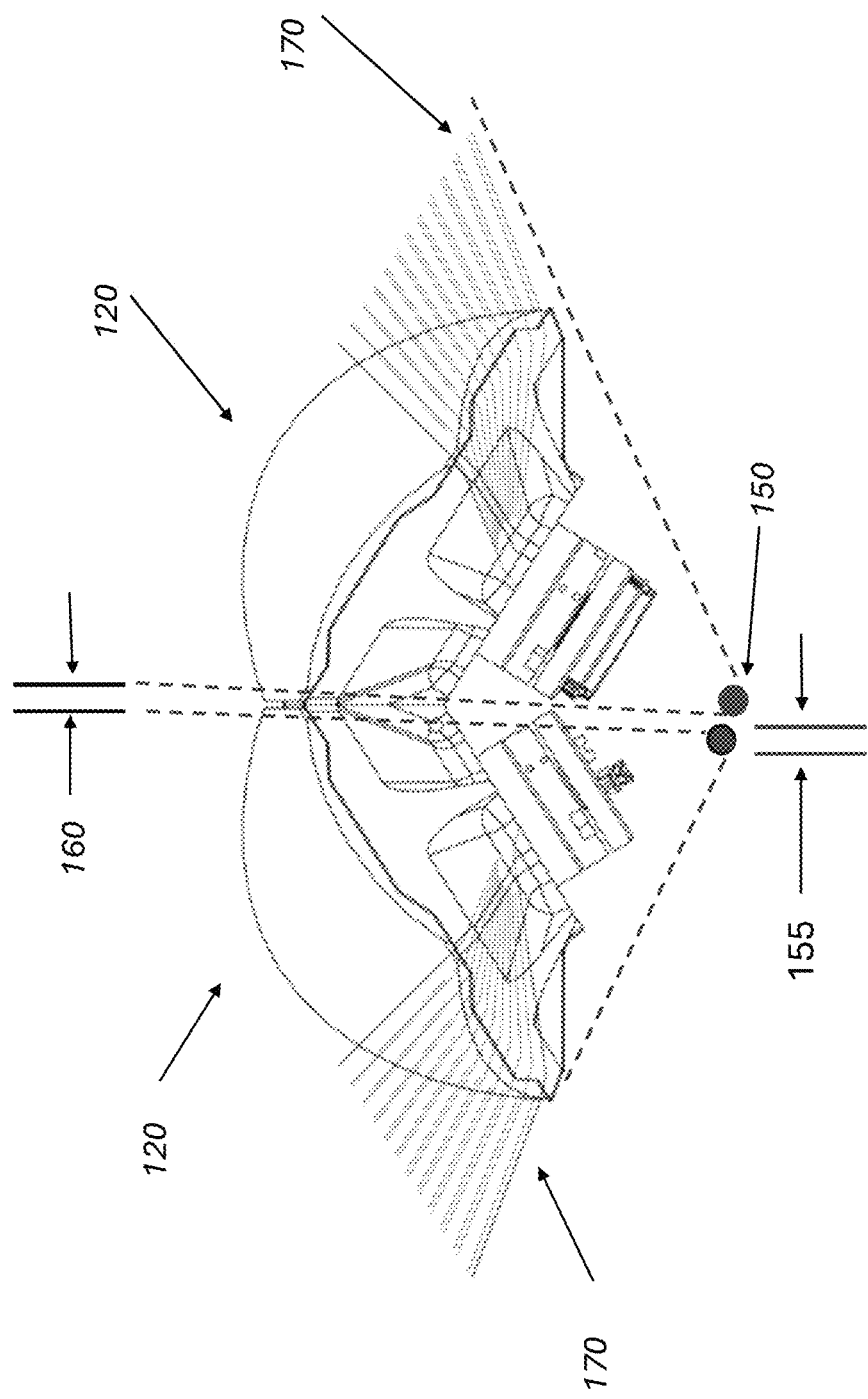
Figure 3B:
FIG. 3B depicts entrance pupil positioning relative to two adjacent camera channels.

A key consideration in multi-camera system design is the minimum feasible separation 220 (E) between adjacent imaging channels 200, shown in FIG. 3B. This minimum may be fundamentally dictated by the diameter of the entrance pupil (EPD), or LP smudge size, as shown in FIG. 1B. In practice, pushing E significantly below the EPD often introduces serious optical penalties, such as excessive vignetting at mid-edge fields or requiring a much shorter focal length that compromises other system requirements. Additionally, the achievable intra-channel spacing can be limited by the size of the image sensor package. Smaller sensor packages typically allow for more flexibility in positioning the entrance pupil (EnP) rearward within the lens system, thereby reducing separation E. Larger sensor assemblies may limit this inward shift and impose a practical floor on the minimal channel gap. The placement of the EnP may be a key lever in minimizing parallax between adjacent camera modules. Shifting the EnP rearward may reduce inter-channel separation but may be constrained by physical limits-such as collisions between lens elements or insufficient clearance for the sensor electronics. Moreover, pushing the EnP back often changes other optical parameters, such as overall lens length and f-number, and may alter incidence angles at the sensor edges.

In configurations with shallow angles, the sensor package width may be the dominant constraint on E. Conversely, in configurations where channels are oriented at steeper angles, the lens's overall length may be the limiting factor. As a result, a holistic view of geometric, optical, and mechanical factors may be necessary when deciding how to position the EnP for minimal parallax. Consequently, lens designers must account for constraints on the distance E, mechanical constraints such as sensor module size, and optical specifications (e.g., FOV, numerical aperture or F #, magnification, focal length), when seeking a compact multi-camera layout. Some multi-camera systems 100 may accommodate more generous spacing without significantly affecting performance, whereas others operate within narrower design margins that magnify the importance of EPD.

Optical System Design-Optimal Entrance Pupil Separation

When determining the optimal entrance pupil separation for custom optics or OTS lenses, the multi-camera system 100 may be first specified to operate within a known minimum and maximum object distance. Designing the optical layout—particularly the separation and placement of each entrance pupil (EnP)—may therefore be guided by these distance constraints, ensuring that parallax errors are controlled or minimized over the intended operational range. For example, if the system must image objects 230 between 5 km and 20 km distant, it will be designed to accommodate both extremes, $d_{min}$ and $d_{max}$, without incurring unacceptable image artifacts. A practice in lens design may be to pick a nominal (or ideal) object distance within this allowable range and optimize the lens design to yield minimal or zero parallax specifically at that distance. When the object lies exactly at this calibrated distance, images from adjacent channels appear seamlessly matched. Any small alignment errors can be further corrected via calibration software-based pixel mapping.

Although zero parallax can be guaranteed at a calibration distance de in object space, objects closer to or farther from this distance may still introduce some discrepancy. This occurs, as illustrated in FIG. 3B, because a real object distance d deviates from the calibrated distance $d_c$. A convenient model to describe this misalignment is given by $\delta = E*(d-d_c)/d_c$, where $\delta$ is the misalignment 225 in object space, E is the separation 220 between entrance pupils of adjacent cameras 200, $d_c$ is the calibration imaging distance, and d is the actual object distance, constrained by $d_{min} \leq d \leq d_{max}$ and an angular error $\theta$ is given by $\tan \theta \sim E/d_c$.

A multi-camera system 100 may be designed to constrain parallax-induced angular errors $\theta$ across the entire range of expected object distances—from the minimum imaging distance $d_{min}$ to the maximum anticipated imaging distance, $d_{max}$, which for many telescopic imaging applications corresponds with optical infinity—to be on the order of a single pixel, or at most several pixels, in the final image. This design strategy effectively minimizes parallax artifacts, maintaining high accuracy and seamless image alignment across the entire spectrum of object distances that the system is expected to handle. Furthermore, it may be not essential for telescopic optical systems to be custom-designed to achieve a specific entrance pupil (EnP) separation E. In numerous telescopic applications, the EnP separation 220 may be considerably larger without compromising the overall system performance.

For multi-camera systems 100 with longer focal lengths and larger aperture diameters—such as many telescopic arrays—achieving tight mechanical packaging may be neither necessary nor always desirable. Larger entrance pupils, on the order of 50-100 mm or more, inherently prevent bringing multiple entrance pupils into extremely close proximity. In these scenarios, it may be advantageous to let the entrance pupils reside in front of the imaging plane and accept a more spacious mechanical configuration. The increased pupil size, longer effective focal lengths (EFL) that can be >50 mm, narrower field-of-view (e.g., FOV≤10 degrees), and typical longer-range objects of interest, may enable parallax to approach its theoretical minimum without a complicated optical design. Tight mechanical packing may be not necessary, with a small seam width relative to the imaging resolution in the environment, and the system can still provide near parallax-free imaging due to the long EFL and narrowed FOV. This flexibility simplifies tolerances, can ease mechanical constraints, and alleviates the need for specialized lens optimization to achieve acceptable parallax performance.

Parallax and Perspective

More broadly, panoramic depictions of an environment may be created from a collection of images from an arbitrary number of cameras at arbitrary locations. This type of situation may be fraught with challenges related to the degree of parallax between cameras of the system. In typical systems, adjacent cameras have significant FOV overlap between them, and then capture similar content from significantly different directions. While this may be useful for stereo vision, for panoramic viewing, significant image errors from differences in camera perspective may occur. In a high parallax system, objects closer to the cameras will occlude different portions of the scene that are farther away as seen by different cameras of the system. Adjacent, but FOV overlapped cameras with large parallax differences between them, can image different portions of an object that appear different in color or detail. Resolving these parallax induced occlusion or image difference effects may be computationally challenging and artifact or error prone.

Within a lens design, parallax, and its effects or impact may be analyzed various ways. Whether the low-parallax lens design and optimization method and merit function uses operands based directly on chief ray constraints or spherical aberration of the entrance pupil (PSA), the resulting data may also be analyzed relative to changes in imaging perspective. In particular, parallax errors versus field and color, which may be referred to as spherochromatism of the pupil (SCPA), may also be analyzed using calculations of the Center of Perspective (COP). The COP is a point to which imaged chief rays from object space appear to converge to, in a similar manner to the concept of perspective in drawing and architecture. It is a geometric condition that for any two objects that are connected by this chief ray they will show no perspective errors. For all other fields the two objects above will show parallax in the image when they are rotated about the COP. It may be convenient to choose the field which defines the COP to be important within the geometry Of the camera. However, there may be residual variations in parallax or perspective in an optimized lens. Thus, the COP may be the location of an NP point for a given field where its projected chief ray crosses the optic axis. More broadly, the COP may be measured with a center of mass for a projection of chief rays, or an average location along the optical axis for all chief ray projections in a ray bundle. Perspective differences or parallax errors may be reduced by optimizing a chromatic axial position ($\Delta z$) or width within a low parallax (LP) volume or LP smudge related to a center of perspective for one or more field angles within an imaged FOV. Just as an entrance pupil may be a smudge, spread out along the optical axis in proportion to the amount of SPA present in the imaging system, there may be no single center of perspective in any camera system. As a result, this model may account for small amounts of residual error, typically quantified as an RMS reprojection error and described in more detail below, that cannot be eliminated. In particular, some algorithms have been developed to modify a software pinhole model of a lens, to account for a center of perspective that wanders as a function of field, particularly for fisheye lenses where this COP variation may be more prevalent and results in large RMS reprojection errors. This type of model can better mimic the perspective of a physical lens.

Perspective works by representing the light that passes from a scene through an imaginary rectangle (realized as the plane of the illustration), to a viewer's eye, as if the viewer were looking through a window and painting what is seen directly onto the windowpane. In drawings and architecture, for illustrations with linear or point perspective, objects appear smaller as their distance from the observer increases. In a stereoscopic image capture or projection, with a pair of adjacent optical systems, perspective is a visual cue, along with dual view parallax, shadowing, and occlusion, that can provide a sense of depth. In the case of image capture by a pair of adjacent cameras with at least partially overlapping fields of view, perspective differences are a cue for apparent image pointing differences within a camera's FOV, while parallax is a difference in apparent image pointing for images captured at or near the seams, or along the truncated lens edges, of two adjacent cameras. The differences in opto-mechanical parallax between two adjacent cameras, which depends on the seam width and the mechanical camera pointing accuracy, can be larger than the residual parallax differences from a low-parallax optical design.

Analytically, the chief ray data for a lens design may also be expressed in terms of perspective error, including chromatic errors, as a function of field angle. Perspective error may then be analyzed as a position error at the image between two objects located at different distances or directions. Perspective errors can depend on the choice of COP location, the angle within the imaged FOV, and chromatic errors. The COP can vary as a function of field angle, and can be optimized to shift axially along the optical axis versus field angle, thereby also reducing residual parallax errors across the overlapping regions between adjacent imaging units. As another example, it can be useful to prioritize a COP so as to minimize green perspective errors. Perspective differences or parallax errors may be reduced by optimizing a chromatic axial position (Az) or width within an LP volume related to a center of perspective for one or more field angles within an imaged FOV. The center of perspective may also be graphed and analyzed as a family of curves, per color, of the Z (axial) intercept position (distance in mm) versus field angle. Alternately, to get a better idea of what a captured image will look like, the COP can be graphed and analyzed as a family of curves for a camera system, as a parallax error in image pixels, per color, versus field.

In low-parallax multi-camera system, the cameras can share a nominally common center of perspective, and the process of image registration may be relatively straightforward, as the images may be already aligned, or nearly aligned, with respect to a common center of perspective. Additionally, the overlapping FOVs may be small. Low parallax and extrinsic calibration allow for very small regions of overlap in which the parallax induced affects can be negligibly small so as to be imperceptible to a visual observer (e.g., ≤3 JNDs (just noticeable differences)). There are at least 4 parameters that may degrade a composite blended or tiled image at the boundary or overlap region where two adjacent images are combined; color changes, alignment errors, missing data (optical gap), and parallax alignment differences versus depth or angle. For example, the JNDs may be used to measure local color, pattern, or content discontinuities between images of an object captured by two adjacent cameras within an overlap region. The JNDs for parallax depend on various factors including the resolution of the image, the viewing distance, and the amount of angular overlap between the images. This means that computationally simple techniques may be used to form the panoramic depiction allowing for real-time video applications. In summary, the partial overlaps between adjacent fields-of-view may be configured to provide enough redundancy for parallax correction via core field-of-view selection and image blending.

Depending on the low-parallax lens design (e.g., FIG. 1A) and the image sensor choice, these differences in residual parallax of perspective error may be fractions of a pixel to several pixels in magnitude. In optical terms, one meaning may be that the paraxial and non-paraxial entrance pupils may be non-identical in a meaningful way. In software calibration terms, this means that there may be variations from the ideal fixed virtual pinhole assumption that may have significant impact on image calibration and re-projection error estimation. However, these low-parallax lenses, with their residual differences in the non-paraxial entrance pupils, or NP points, or virtual pinholes, optimized to benefit the chief rays along a polygonal outer lens element edge, may be significantly different than both normal lenses and fisheye lenses, the latter having high distortion, very large fields of view, and spatially shifting non-paraxial "entrance pupils" located near the front of the lens, before the aperture stop. The residual differences from an ideal fixed virtual pinhole assumption may not matter for many imaging applications, but matter more for others (e.g., photogrammetry). The image processing software may be adapted accordingly.

Multi-Camera Systems

The multi-camera devices 100 of FIGS. 1A, 1B, 2A, and 2B, or variants thereof, further include an image processing module and an image calibration module, that in combination render the image data captured by the image sensors of the respective camera channels to produce images with an improved apparent image quality. The image processing by the calibration modules applies methods for both intrinsically and extrinsically calibrating the individual camera channels, storing the calibration data, updating it as appropriate, and applying it to improve the geometrical and other image quality aspects or metrics. The image processing module applies methods and software for compositing images from two or more adjacent camera channels to provide a larger panoramic image. In particular, when working with images captured by adjacent cameras with low relative parallax within and between the cameras, and small field of view overlaps between adjacent cameras (e.g., an XFOV), the image processing module can be used to apply image blending algorithms and methods to advantageously combine adjacent images in real-time. Nominally, the image sensor of each camera channel has an image adaptor module or board that provides image data to the image processing module via cables (e.g., MIPI or GMSL). An image calibration module comprises at least calibration software operating on a camera module (near the image sensor) or on a processor such as an Nvidia Orin AGX, or an external computer or a combination thereof. As an example, an image processing module can at least consist of an geometric calibration software to create a per-pixel mapping operating on an onboard processor such as an Nvidia Orin AGX, or on an external processor or computer, or as a combination thereof. The processors include or are complimented by memory that stores non-transitory computer-readable media storing instructions, the instructions, that when executed, enable the one or more processors to perform operations. This blending method can be applied to multi-camera systems using custom low-parallax lenses (e.g., FIGS. 1A and 1B), or systems with lenses with small FOVs, including telescopic optics (FIGS. 2A,B), or standard off-the-shelf (OTS) camera lenses. The image sensors can be CMOS or CCD type devices, filtered to detect visible light, or infrared (IR) sensors (including SWIR, MWIR, or LWIR), or event sensors.

In a multi-camera system, adjacent images captured by adjacent cameras may be assembled into a panoramic composite by image tiling, stitching, or blending. In image tiling, the adjacent images can be each cropped to their predetermined FOV and then aligned together, side by side, to form a composite image. The individual images can be enhanced by intrinsic, colorimetric, and extrinsic calibrations and corrections prior to tiling. While this approach may be computationally quick, image artifacts and differences may occur at or near the tiled image edges, particularly when using cameras without low-parallax.

By comparison, image stitching is the process of combining multiple images with overlapping fields of view to produce a segmented panorama or high-resolution image. Most approaches to image stitching require nearly exact overlaps between images and identical exposures to produce seamless results. For example, algorithms that combine direct pixel-to-pixel comparisons with gradient descent may be used to estimate these parameters. Distinctive features can be found in each image and then efficiently matched to rapidly establish correspondences between pairs of images. When multiple images exist in a panorama, techniques have been developed to compute a globally consistent set of alignments and to efficiently discover which images overlap one another. A final compositing surface onto which to warp or projectively transform and place all of the aligned images may be needed, such as algorithms to seamlessly blend the overlapping images, even in the presence of parallax, lens distortion, scene motion, and exposure differences. However, differences in illumination and exposure, background differences, scene motion, camera performance, and parallax, can create detectable artifacts.

In greater detail, in a camera system having large parallax errors, it may be very difficult to merge images from multiple cameras together, even after the camera intrinsic and extrinsic relationships may be known, because the field angles/pixel coordinates corresponding to objects change depending on the distance to the object. In order to determine how to stitch together imagery from multiple cameras, it may be necessary to identify points in the environment common between camera images and use these points to estimate the appropriate parameters. Common methods for detecting and matching points between images include SIFT, SURF, ORB, and other similar methods. The set of commonly matched points may be used with optimization algorithms including RANSAC to estimate the locations to stitch together imagery. This may be very challenging since it requires the environment to contain image characteristics that may be conducive to detecting these descriptive points and the process may be sensitive to lighting variation and environments that are feature-poor. Whereas, in the case of using adjacent low-parallax cameras or telescopic cameras with low-parallax because of their small FOVs, then parallax errors, background differences, and scene motion issues may be reduced, and the amount of FOV overlap between adjacent cameras can be reduced.

An intermediate process of image blending can then be advantageously used, without the larger burdens of image stitching. Most simply, adjacent images can be tiled together, but differences in relative illumination or color performance can make differences in adjacent pixels from adjacent cameras more apparent. Image blending or quilting combines two adjacent images to nominally provide the same pixel values in a stitch-free way. Image blending, which will be discussed in subsequent detail, can include an approach, such as weighted averaging of pixel values near or within a FOV overlap region at or near a seam between adjacent cameras, to provide a smooth calibrated transition of images captured from one camera to an adjacent second camera.

Figure 4:
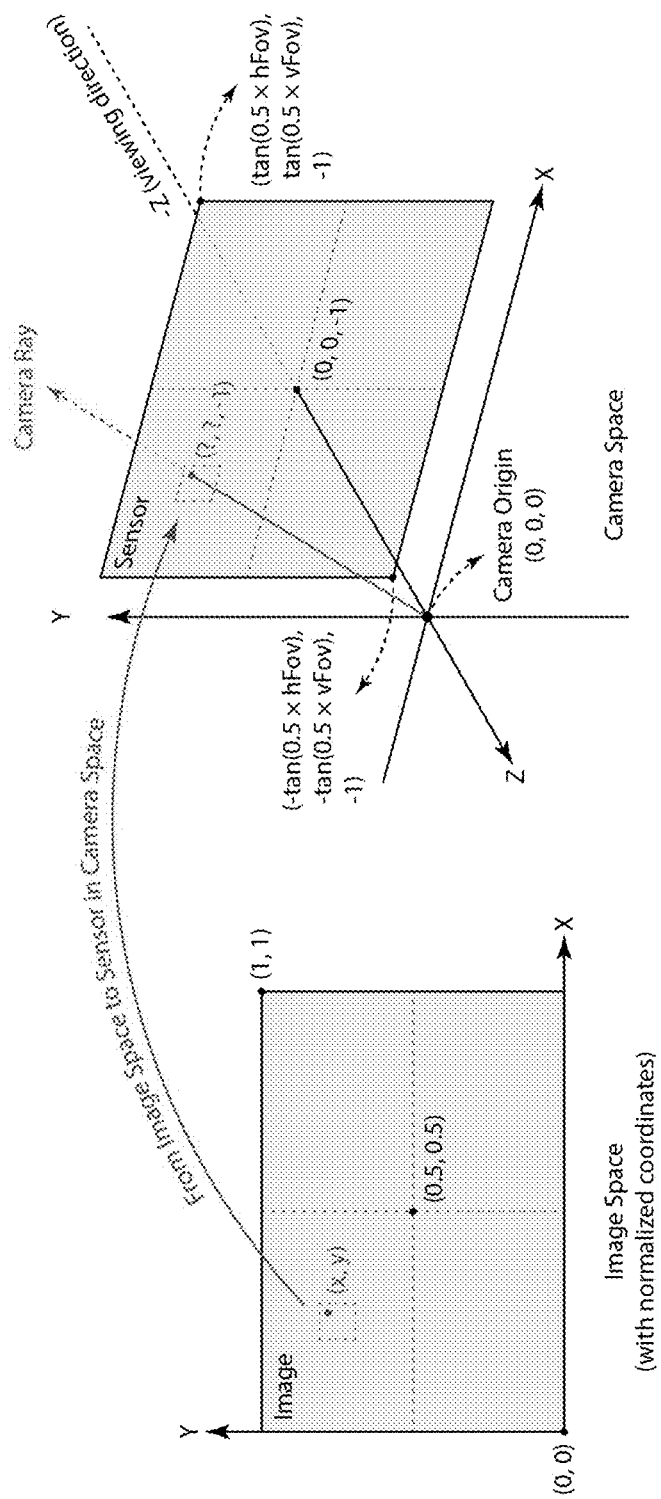
FIG. 4 depicts a diagram of how a pixel in the camera's image plane maps to a direction vector in world coordinates.

Several common methods exist for rendering a panoramic view, each optimized for particular display formats or applications. FIG. 4 shows how a pixel in a camera's image plane corresponds to a direction vector in world coordinates, which serves as the foundation for stitching multiple camera views into a panorama. Two widely used panoramic projections are equirectangular projection and cube map. In a cube map, the environment is mapped onto the six faces of an imaginary cube enclosing the camera system; in an equirectangular (also called latitude-longitude) projection, each pixel corresponds to a specific latitude and longitude on a virtual sphere. Both techniques ultimately store data in rectangular images—either as multiple square faces (cube map) or a single rectangular layout (equirectangular)—but their spatial sampling may be non-uniform. For instance, pixels near the corners of a cube map face represent a different angular coverage than those near the center, while in equirectangular images, pixels near the poles cover considerably smaller solid angles than those around the equator. This non-isotropic sampling may influence rendering choices and necessitates careful interpolation in any stitching or blending routines.

Despite differences in projection geometry, the process for populating the panoramic image pixels may be conceptually similar. First, one imagines a virtual surface (a cube for a cube map or a sphere for an equirectangular layout) that surrounds the camera system. Next, each pixel in the chosen storage format may be associated with a corresponding point or direction on this surface—either a (u,v) coordinate on a cube face or a (latitude, longitude) pair on a sphere. By tracing rays from these points back into the captured image data, each pixel may be assigned appropriate color or intensity values. When multiple cameras are involved, additional blending and warping steps align and merge overlapping regions while respecting each pixel's 3D mapping. This ensures that features from object space remain consistent at camera boundaries and supports real-time or near-real-time composition of parallax-minimized panoramic images.

Multi-Camera Calibration

Before any comparison of parallax or determination of parallelism may be made, for operation of a multi-camera device 100 of FIG. 1A or FIG. 2A, every pixel in each camera's image must be associated with a directional vector (also referred to as its instantaneous field-of-view, or IFOV). In other words, a common 3D coordinate space may be defined and calibrated for each camera so that every pixel maps to a unique direction in object space. Only after this per-pixel direction mapping may be completed, can the system reliably assess whether two pixels from different cameras are looking at the same scene point or if, instead, they exhibit parallax errors.

Geometric camera calibration can include determining intrinsic and extrinsic parameters of a camera, which describe the camera's internal properties and its position and orientation in the world, respectively. The intrinsic parameters of a camera describe the internal properties of each camera channel, such as its focal length, optical center, and a description of the non-linear distortion created by the lens system. They determine how a 3D point within the field of view of the camera may be projected into the 2D image coordinates captured by the image sensor. The extrinsic parameters of a camera describe the position and orientation, or pose, of the camera channel in the world, relative to a reference world coordinate system. This includes the camera's position and orientation in terms of its translation and rotation relative to the world coordinate system. Together these form a mathematical model used to relate 3D coordinates in the real world to 2D image coordinates captured by camera.

In some systems, it may be convenient to model the camera as an idealized pinhole through which light from a scene being captured passes without diffraction to form an inverted image on the image sensor. An advantage of such a model may be that the camera may be described using a very simple linear mathematical model. However, real world optics have non-linear distortion characteristics that must be accounted for. Thus, the intrinsic calibration model typically consists of two parts. The first part comprises a simple 3×3 matrix describing a linear pinhole model. The second part may be a set of distortion coefficients of an equation that describes the sagittal and tangential distortions introduced by the lens system. For other systems, the calculation of an intrinsic calibration model can be enabled by capturing images of a scene containing known points that are readily detectable in the resulting image. A correspondence relationship must be made between points on the target and detected points in the image. For example, the calibration module and process can use a structured light pattern, fiducial markers, or known calibration targets to determine the per-pixel three-dimensional (3D) mapping. In practice, this can be done by capturing images of a known planar target containing a pattern, such as a checkerboard or a grid of dots. Henceforth, these points may be referred to as fiducial points or simply as fiducials, which are used as a fixed basis of reference or comparison.

To allow the pinhole to vary as a function of field angle, one may use a non-standard camera model that includes the field angle as a variable. This type of model can be made to represent the pinhole as a function of field angle, allowing the pinhole to move with respect to field angle. One way to model the pinhole's movement may be to use a polynomial or a spline curve to describe its position as a function of field angle. For example, if a spline curve is used, the initial parameters may be knots and control points, taking a series of field angles and their projected location along the optical axis, to define the shape of the spline. To optimize the curve, the Levenberg-Marquardt (LM) algorithm may be used, for example, using the RMS reprojection error as the cost function to be optimized. Allowing the pinhole to move as a function of field angle may reduce the RMS reprojection error as compared to a static pinhole model, but it will increase the complexity of the camera model and increase the computational resources required.

The intrinsic calibration process can be described by a series of equations, that describe the projection of points in the real world onto an image sensor. For example, a matrix equation describes the transformation of a point in real world coordinates to the coordinate system of the camera. Subsequent equations may be applied to convert the point into a two-dimension homogeneous vector. The distortion model uses even powers of the radial distance from the optical axis of the imaging system. A next equation describes the square of the radial distance, which may be then used to calculate a sagittal distortion as a function of radial distance. Subsequent equations are used to combine the sagittal with tangential distortion terms. A matrix equation may then be used to model projective keystone distortion created when the sensor is mounted such that it is tilted away from the optical axis of the lens system, in which the calculated values for sagittal and tangential distortion are transformed and subsequently normalized. Finally, the linear pinhole camera model may be applied, resulting in image sensor pixel coordinates.

It is noted that camera calibration typically also accounts for other intrinsic parameters, which are intrinsic to the camera optics, to the optical design or the fabrication realities thereof, but which are not identified as "intrinsics" in the field of geometric camera calibration and the enabling software. These other camera calibration factors account for radiometric, photometric, or chromatic differences in lens performance, including variations in MTF or resolution from aberrations and internal lens assembly and sensor alignment variations, thermal response variations, relative illumination (RI) and vignetting, sensor quantum efficiency (Qeff) differences, and other factors.

In greater detail, after accounting for lens distortion and sensor geometry via an intrinsic calibration, each pixel p at coordinates (x, y) on the sensor corresponds to a unique direction vector $r_p$ in three-dimensional space. This vector may be obtained by transforming the pixel coordinates through the camera's intrinsic matrix and distortion models to yield a ray in the normalized camera coordinate system, and subsequently rotating and translating that ray via the camera's extrinsic parameters into a common world coordinate frame. Formally, if K is the intrinsic calibration matrix (containing focal length and principal point information), D represents the distortion parameters, and (R, t) represents the rotation and translation for the camera, the mapping may be as follows:

Convert pixel coordinates $(x_{pix}, y_{pix})$ to normalized coordinates $(x_n, y_n)$ using the inverse intrinsic matrix $K^{-1}$ and correcting for distortion D:

$$[x_n, y_n] = f^{-1}(x_{pix}, y_{pix}, K, D)$$

where $f^{-1}$ symbolically represents the inverse transformations (including removal of radial/tangential distortions) that return the pixel to a distortion-free, idealized pinhole representation.

Once in the normalized camera frame, a pixel's IFOV direction vector before extrinsic transformation is $d = [x_n, y_n, 1]^T$.

Applying the extrinsic parameters (rotation R and translation t) places this direction vector into a common world coordinate system:

$$r_p = R \cdot d + t$$

Here, for direction-only purposes, if a camera is assumed to sit at the origin of its local coordinate frame, the IFOV direction vector may be normalized and the translation t primarily serves to set the camera center in world coordinates. As a result, each pixel now corresponds to a unique direction or vector in space, effectively defining an instantaneous FOV (IFOV) for that pixel.

By performing the calibration steps outlined above, each pixel in every camera's image corresponds to a direction vector in a common world coordinate frame. This per-pixel mapping enables precise definition of where each pixel's instantaneous field of view (IFOV) points in object space. Once these direction vectors are obtained, a next step may be to identify a subset of pixels in each camera's image—referred to as the "core FOV"—whose direction vectors may be configured so that, at the boundary between two cameras, the rays are parallel (or nearly parallel) to the rays from the adjacent camera. Achieving this parallelism enables a parallax-free seam where the images may be joined seamlessly, independent of scene content.

Core FOV and Extended FOV

Continuing with this approach, the next step may be to leverage the calibrated intrinsic and extrinsic parameters to define a suitable rectilinear field-of-view (FOV) region for each camera module. Conceptually, each pixel in each camera's sensor plane may be represented as a vector emanating from a virtual pinhole located at the camera's center of projection, which may be fixed for all field angles to a common point, or which, as previously discussed, may vary in position along the optical axis as a function of field angle.

Figure 5B:
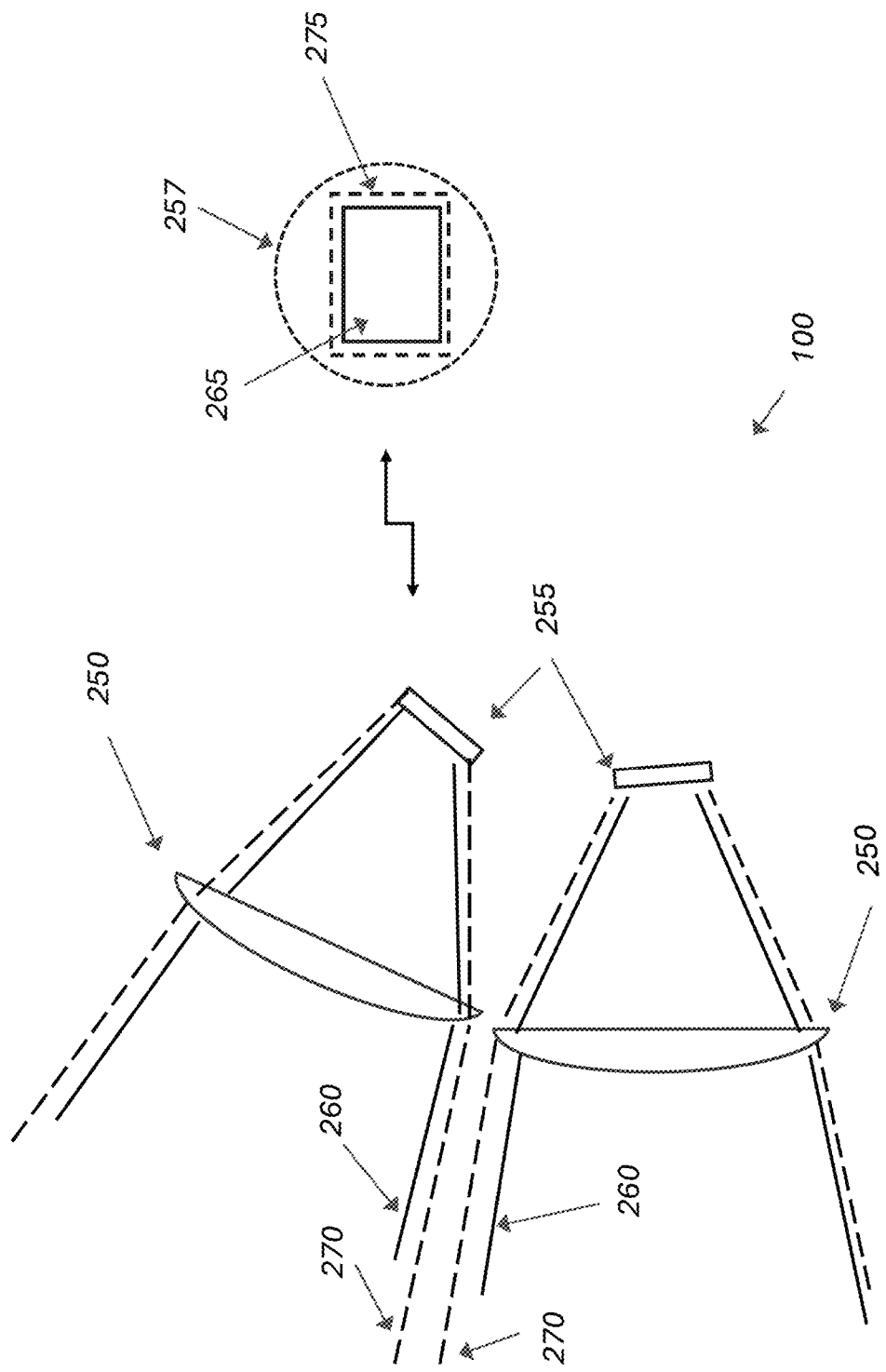
Figure 5C:
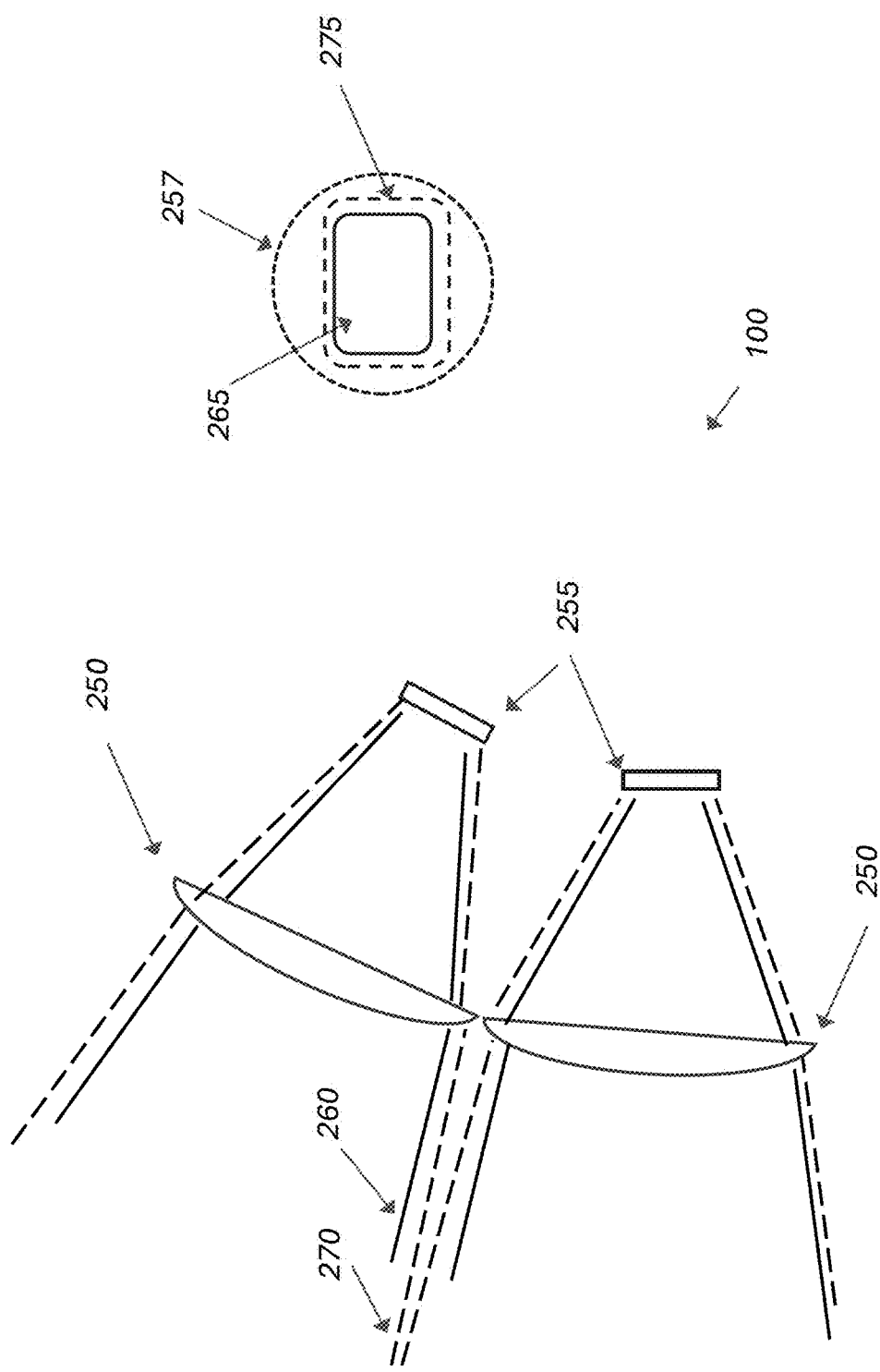

For example, FIG. 5A depicts part of a multi-camera system 100 with two adjacent cameras 250, each having an image sensor 255. The two cameras 250 each have a core FOV 260 that at their edges, project in nominally parallel fashion with respect to one another into object space, while the XFOVs 270 will eventually overlap in object space. As shown in the zoomed in area of FIG. 5A, an image sensor 255 can have a defined image area corresponding to the summed area of the core FOV 265 and extended FOV 275, where the XFOV 275 extends slightly smaller than the active area of the image sensor. For cameras 250 that are standard OTS devices with round lenses 250, a FOV 257 incident to the image plane can be circular, although typically a field stop is used to mask the imaged light down to dimensions modestly bigger than the active pixel area of the image sensor. Each camera 250 essentially has its own coordinate system that then maps into a larger 3D coordinate system in object space. As illustrated in FIG. 5B, with a few pixel rays along the edges of the FOVs 260 and 270, the adjacent cameras may not be initially or physically parallel at the boundary or seam due to tolerances. Relative alignment can be mechanically improved with tighter tolerances or adjustment mechanisms. The calibration process can also be used to define a nominal center pixel for the imaged FOV, which can be different than the nominal center pixel for the active area of an image sensor 255. Thus, the definition of a nominal XFOV 275 accounts for both a target number of image pixels needed to support calibration and a number of pixels needed to account for an optical and mechanical tolerance budget. As the perimeter XFOV accounts for tolerances, its' extent or width may not be identical at seams between a first camera and the adjacent cameras on the left and right sides of that first camera. With allowance for an XFOV, then after mechanical adjustments or calibration, the effective alignment of adjacent camera channels 250 can be improved, to that of FIG. 5B.

Figure 5D:
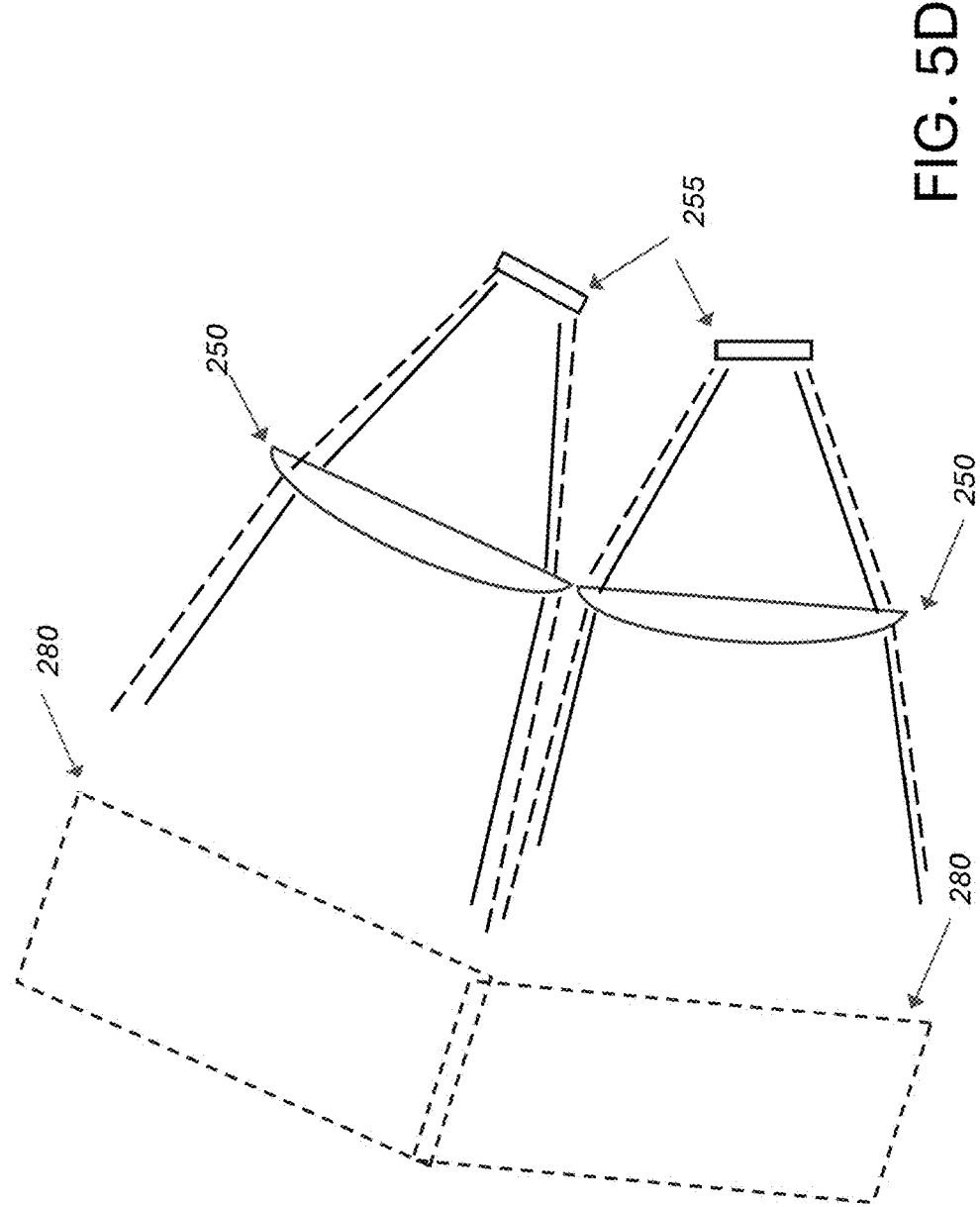
Figure 5D:
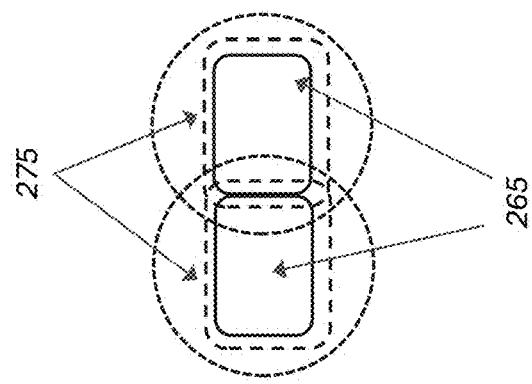

FIG. 5D then depicts a relationship of the cameras 250 of a multi-camera array 100 to object space. Two exemplary FOVs 280 are depicted, incident to the respective cameras 250, to be imaged to the image sensors 255. As lenses are not optically perfect, the images provided at the sensors, within both core FOV 265 and a larger FOV with XFOV 275 are imperfect, and the pixel positions may be shifted, principally by distortion, resulting in changes in the size and shape of these FOVs. These changes may be measured during intrinsic calibration, and the data used by the calibration module to improve the geometrical shape of the digital image. These corrections will principally account for camera distortion, and use an ideal pinhole camera model, although a more refined pinhole model may also account for residual parallax or perspective errors from a camera. Extrinsic calibration can be used to determine camera position, to determine the effective center pixels, and the effective edge or perimeter pixels for the Core FOVs. The calibration process can also determine corrective factors, such as weighting factors that can be used within the XFOVs or overlap FOVs during image blending. Because the XFOVs are increased in size beyond what may be needed for calibration, so as to provide a budget for mechanical tolerances, then an XFOV image blending region can extend within the Core FOV of an adjacent camera channel. FIG. 5D also depicts FOVs of two adjacent cameras, relative to the image sensors, as projected into object space. The two Core FOVs 265 touch, and the two XFOVs 275 overlap. Due to the real-life variations in mechanical components and assemblies, the real XFOVs can vary within the tolerance ranges, and vary asymmetrically versus the Core FOV of a camera channel or a plurality thereof. Thus, it can be useful to have the nominal camera channel pixels within the total FOV (Core FOV+XFOV) be slightly smaller than the total available pixels in an image sensor active area. The calibration module and process can then be used to project the digital images, with the corrections from intrinsic and extrinsic calibration, to represent what the object space panoramic scene looked like. The goal is to recreate the scene, as represented by the ideal FOVs 280. The resulting 3D reprojection of what the panoramic scene looked like, depends on the geometrical mapping (e.g., cubic or equirectangular), corrections for distortion, and corrections for other factors including relative illumination (RI) and vignetting, lateral color, other optical aberrations, ghosting and glare, and residual parallax differences.

When operating in a narrow-field of view (paraxial) configuration, the absence of tightly packed entrance pupils near a device center necessitates an additional step of core-FOV bounding and parallel alignment to ensure each channel lines up seamlessly with its neighbor. Thus, after deriving intrinsic and extrinsic parameters, a boundary set of pixels (for each camera) may be identified to yield direction vectors closely matching (or within a minimal angular tolerance of) the boundary rays of an adjacent camera. As the overall FOV may be small (<10 degrees), even if the cameras are physically spaced or offset, the small absolute difference in apparent object space angles ensures that the boundary can be aligned to appear parallax-free. This results in a "square cutout" or "rectangular region" (the core FOV) that merges precisely with the next camera's region—a key distinction versus lens designs providing physically collocated or nearly collocated no-parallax points behind the sensor plane. With multi-camera systems with such long focal length narrow FOV cameras, the opto-mechanics can allow adjacent cameras to be further apart mechanically and rely on the 3D calibration software to define each core FOV's parallel alignment—thus achieving the same parallax-free boundary with simpler or even off-the-shelf (OTS) optics.

When building a multi-camera device, such as the device 100 described herein, one may incorporate knowledge of the intrinsic model for each camera channel of the device 100, as well as corresponding extrinsic models that relate the camera channels 120 of the device 100 to each other in order to record the appearance of the environment surrounding the device. The intrinsic parameters of each camera channel, the corresponding extrinsic models as described below, as well as the other camera calibration factors are together referred to as camera configuration data of the device 100.

Core FOV Calibration

In order to produce a seamless, parallax-free composite image from multiple cameras, each camera's "core" FOV needs to be defined as a polygon—commonly a rectangle or square—whose boundary rays align in parallel with the boundary rays of the adjacent camera. Below is a more detailed, step-by-step explanation for how to derive these polygonal FOV boundaries in practice.

Conceptual Approach for selecting parallax-free core FOV boundaries:

Establish a Reference Frame: Choose a reference global coordinate system. This may be aligned to one camera (e.g., camera A) or to a neutral frame derived from the average position and orientation of all cameras. In this frame, every pixel in each camera maps to a direction vector $r_p^{(c)}$, where C denotes the camera and p the pixel index.

Define Parallelism Criteria: For two adjacent cameras, say camera A and camera B, the boundary sets of pixels can be selected from each image to produce direction vectors $r_p^{(A)}$ and $r_{p'}^{(B)}$ that are parallel (or within a small angular tolerance). Formally, if $\theta_{pp'}$ is the angle between $r_p^{(A)}$ and $r_{p'}^{(B)}$, then:

$$\theta_{pp'} = \arccos\left(\frac{r_p^{(A)} \cdot r_{p'}^{(B)}}{\|r_p^{(A)}\|\|r_{p'}^{(B)}\|}\right) \approx 0.$$

Since both $r_p^{(A)}$ and $r_{p'}^{(B)}$ should be normalized direction vectors, this simplifies to ensuring $r_p^{(A)} \cdot r_{p'}^{(B)}$ is close to 1 (e.g., greater than some threshold like 0.9999).

Identify Boundary Pixels: Each camera's image plane may be represented as a grid of pixels (u,v). Contiguous pixel subsets (rectangular regions) in each image are determined that meet a parallelism criteria at their edges. For instance, consider camera A's rightmost edge and camera B's leftmost edge. A mapping from a row of pixels on A's boundary to a row of pixels on B's boundary may be then determined such that for each pair, the corresponding rays are parallel.

As examples for an initial guess:

Assume a simple rectilinear region in camera A, defined by pixel coordinates $(u_{A,min}, v_{A,min})$ to $(u_{A,max}, v_{A,max})$.

Identify a corresponding region in camera B with a similar size.

Evaluate parallelism for pixel pairs along the boundary lines.

Iterative Refinement and Optimization: Start with an approximate boundary and evaluate the parallelism measure. If the rays are not sufficiently parallel, adjust the region boundaries or shift the pixel indices used. This may be formulated as an optimization problem:

Objective: Maximize the average dot product between corresponding boundary rays from camera A and B, or equivalently, minimize the angular discrepancy.

Constraints: The pixel sets must form contiguous rectangular regions within each camera image (post intrinsic calibration).

A simple approach might include one or more of:

Fix camera A's region and adjust the boundaries in camera B's region (or vice versa) to find the best match.

Use a gradient-free optimization (like a grid search or Nelder-Mead) over small shifts and scalings of the candidate region.

For each candidate region, compute the average parallelism metric (e.g., the mean angle between corresponding boundary rays).

Choose the region that yields the smallest average angle.

Expanding the Core FOV Regions: Once the boundary alignment is found, expand inward from the boundary into each camera's image to define the full core FOV rectangle. The core field-of-view region for each imaging unit can be defined so that any residual misalignment corresponds to less than a threshold pixel offset in a 3D-reprojected image space, thereby reducing parallax artifacts at the boundaries. Alternately a threshold criteria based on visual JNDs may be used, which may allow a larger residual misalignment across a Core FOV perimeter edge (e.g., ≤2-3 pixels). Since the boundary now matches parallel sets of rays, selecting any interior region that remains consistent with the camera's principal pointing directions will maintain parallelism at the boundary. The core FOV should be large enough to cover the intended viewing portion but not so large as to include rays that deviate from parallelism at the boundaries.

Selecting Extended FOV for Blending: To ensure robustness against mechanical tolerances or slight misalignment over time, add an extended field-of-view (XFOV) margin around the core FOV. These pixels serve as a buffer zone for blending. More detail on this extended FOV selection is provided in a later section.

The image blending can be done by processes including: (1) defining a smooth weighting function (like a cosine or linear ramp) that transitions from using camera A's pixels fully at one side of the boundary to using camera B's pixels fully at the other side; and (2) applying feathering or spline-based interpolation to ensure that no visible seam occurs even if small angular deviations arise.

Core FOV Calibration

In an alternative or supplemental approach to defining core FOV boundaries, the system can perform a factory calibration that leverages grouped pixel "patches" and waveform-based matching. Rather than (or in addition to) evaluating per-pixel direction vectors and iterating pixel-by-pixel for parallel alignment, this method aggregates subsets of pixels that share closely related direction vectors, then compares and matches "waveforms" or intensity signals across cameras. This approach can be especially advantageous in production environments where robust alignment may be necessary, but per-pixel analysis would be time-consuming or prone to localized noise.

This waveform matching method can include a step to divides the image sensor area of each camera into a grid of "patches" or "blocks" of pixels, and assign each patch a representative direction vector. The calibration software then sorts or indexes these patches according to increasing field angle (e.g., measured from the optical axis to the edge), effectively creating a "directionality map." To enable parallax optimization, between each pair of adjacent cameras, the calibration routine identifies the subset of patches near an intended seam.

In conjunction with patch-based grouping, a waveform matching technique can be used to robustly measure and confirm that the patches truly overlap in object-space perspective, even before any scene-specific content appears. The "waveform" here can be a time-domain or spatial-domain pattern introduced during calibration that each camera captures. An illuminated test chart or light pattern to obtain an intensity curve (a "waveform") that indicates how the observed brightness changes in time for each patch. Because each patch is capturing a slightly different angle of the same test pattern, the waveforms should be nearly identical (up to a small amplitude shift) if they view the same region of the pattern from a "parallax-free" perspective. The calibration software then computes a cross-correlation between patch waveforms from Camera A and Camera B. The system can then iteratively "slide" or "nudge" the candidate boundary along a seam. The calibration software can normalize waveforms by subtracting average luminance or dividing by amplitude to handle moderate lighting changes.

After determining which patch pairs exhibit high waveform correlation (and therefore minimal parallax), the calibration module "connects the dots" to form a continuous boundary line in patch space. The patches inside that boundary may be designated as the camera's core FOV. Patches lying beyond the boundary (where cross-correlation with adjacent cameras drops or phase mismatch grows) may be included in the extended FOV (XFOV). These extra patches provide a margin for mechanical tolerances and real-time blending.

One of the key advantages of the proposed patch-based waveform calibration method may be its robustness to noise. By averaging over many pixels, patch-based grouping inherently reduces the impact of random sensor noise and mitigates issues caused by isolated dead pixels. Additionally, this approach enables efficient computation; instead of performing millions of pairwise pixel alignments, the system only needs to compare a modest number of patches, significantly decreasing processing time and resource usage. The method also ensures global consistency, as waveform matching directly confirms that adjacent cameras view the same portion of the test chart in terms of timing or intensity phase.

Opto-Mechanics and Software Core FOV Calibration

Figure 6:
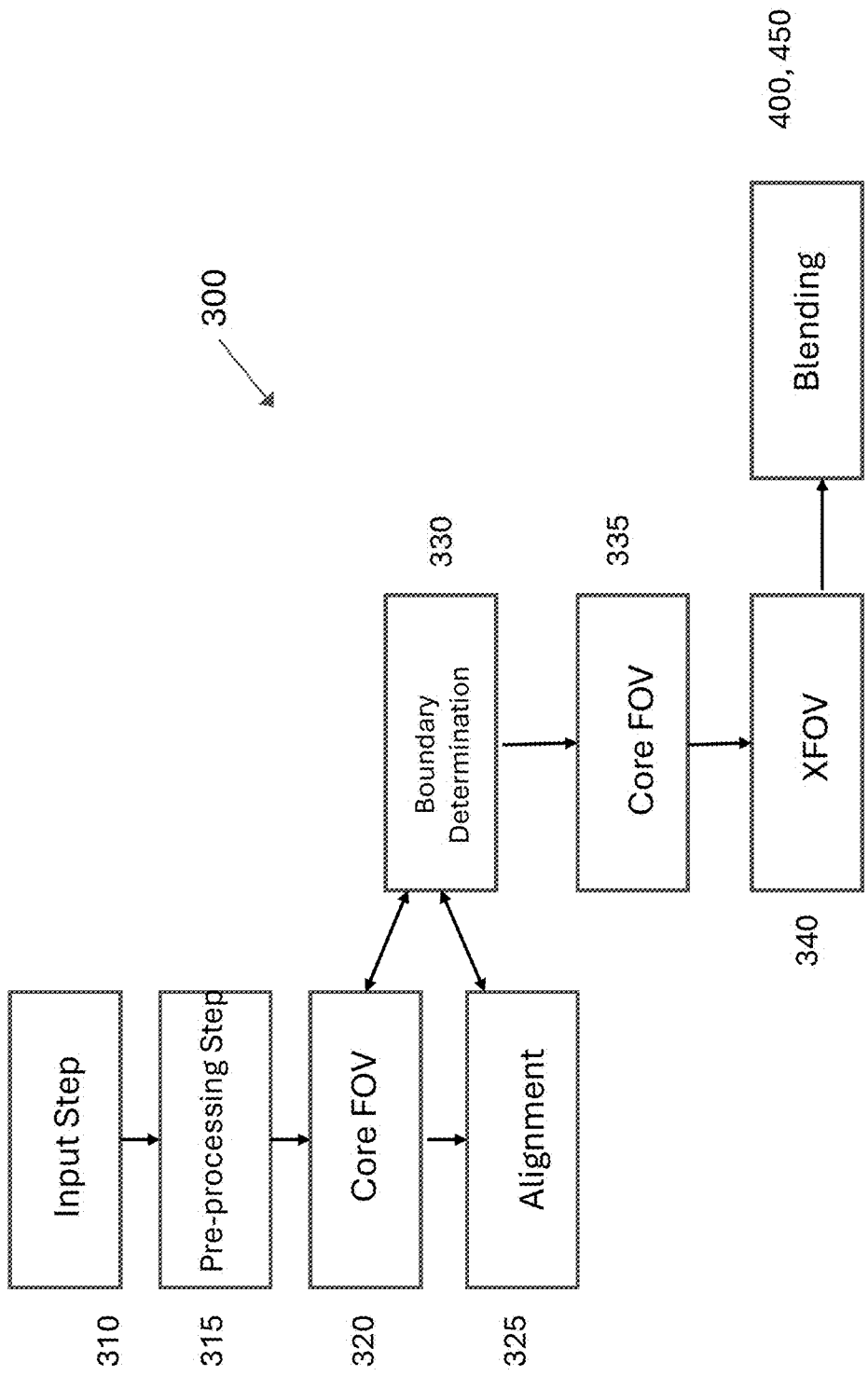
FIG. 6 depicts a software process flow diagram for camera to adjacent camera alignment.

An example Step-by-Step Algorithm for enabling combining or blending of images from adjacent cameras in multi-camera systems 100, with low-parallax cameras such as those of FIG. 1A, or small FOV or telescopic cameras, such as those of FIG. 2A, is illustrated in FIG. 6 and presented below. FOV optimization method 300, which leads into image blending, such as using a blending method 400 (FIG. 8A), starts with an input step 310.

Input (Input Step 310): FIG. 2A,B provides a conceptual sketch of multiple telescopes arranged side-by-side. The entrance pupils 205 are larger and placed in front of their respective imaging planes, showing that tight packing is not necessary and that the system still maintains near parallax-free imaging due to long EFL and narrower FOV. Key elements are that the system includes several telescopic camera modules, each with a large objective lens, with the light rays diverging from each telescope towards object space. Even with significant physical spacing or seams, the parallelism and calibration methods yield minimal parallax.

FIG. 4 depicts a diagram illustrating how a pixel in the camera's image plane maps to a direction vector in world coordinates. Key elements, as shown in FIGS. 5A-D, include a camera model with its imaging sensor depicted. In FIG. 4, the intrinsic matrix and distortion correction may be illustrated as transformations from pixel coordinates to normalized coordinates. The extrinsic parameters (rotation R and translation t) model light rays in a shared world coordinate frame. A single pixel on an image sensor can be highlighted and connected to a line (light ray) extending into the world or object space. The inputs include on or more of: calibrated intrinsic parameters K, D for each camera; calibrated extrinsic parameters (R, t) for each camera; and/or pixel grid dimensions for each camera image.

Preprocessing Step 315:

For each camera and each pixel (u,v), compute the undistorted normalized coordinates and apply extrinsics to obtain the corresponding world-frame direction vector $r_{u,v}^{(C)}$.

Normalize all direction vectors so $\|r_{u,v}^{(C)}\|=1$

Initial Guess of a Core FOV Region, Core FOV Step 320:

Define an initial guess of the core FOV region in camera A, for example a central rectangular block.

Define a corresponding initial region in camera B of roughly similar size and location.

Evaluate Parallelism, in Alignment Step 325:

On the shared boundary line (e.g., the right edge of camera A's region and the left edge of camera B's region), pair up pixels row by row (or column by column, depending on geometry).

Compute the dot product or angle between corresponding pairs of direction vectors.

Optimize Boundary Alignment, in Boundary Step 330:

Adjust the top, bottom, left, and right boundaries of camera B's region iteratively to find a set of pixel pairs that yields maximum average parallelism (dot product close to 1).

This may be done via a small brute-force search or a more systematic optimization routine, such as a binary search (more information below), with the Core FOV, Boundary Alignments, and center pixel selection being modified.

Lock-In Core FOV, Step 335:

Once a high parallelism alignment is found, define that as the final boundary between cameras A and B.

Repeat this process 300 of FIG. 6 for other pairs of adjacent cameras in the array.

Extended FOV Selection, Step 340:

Add a small margin around the core region to create an extended FOV, ensuring that even if small misalignments occur, the blended region can absorb these discrepancies.

The extended region may be also determined by evaluating ray direction consistency, ensuring that it does not include significantly non-parallel rays near the boundary.

Figure 8A:
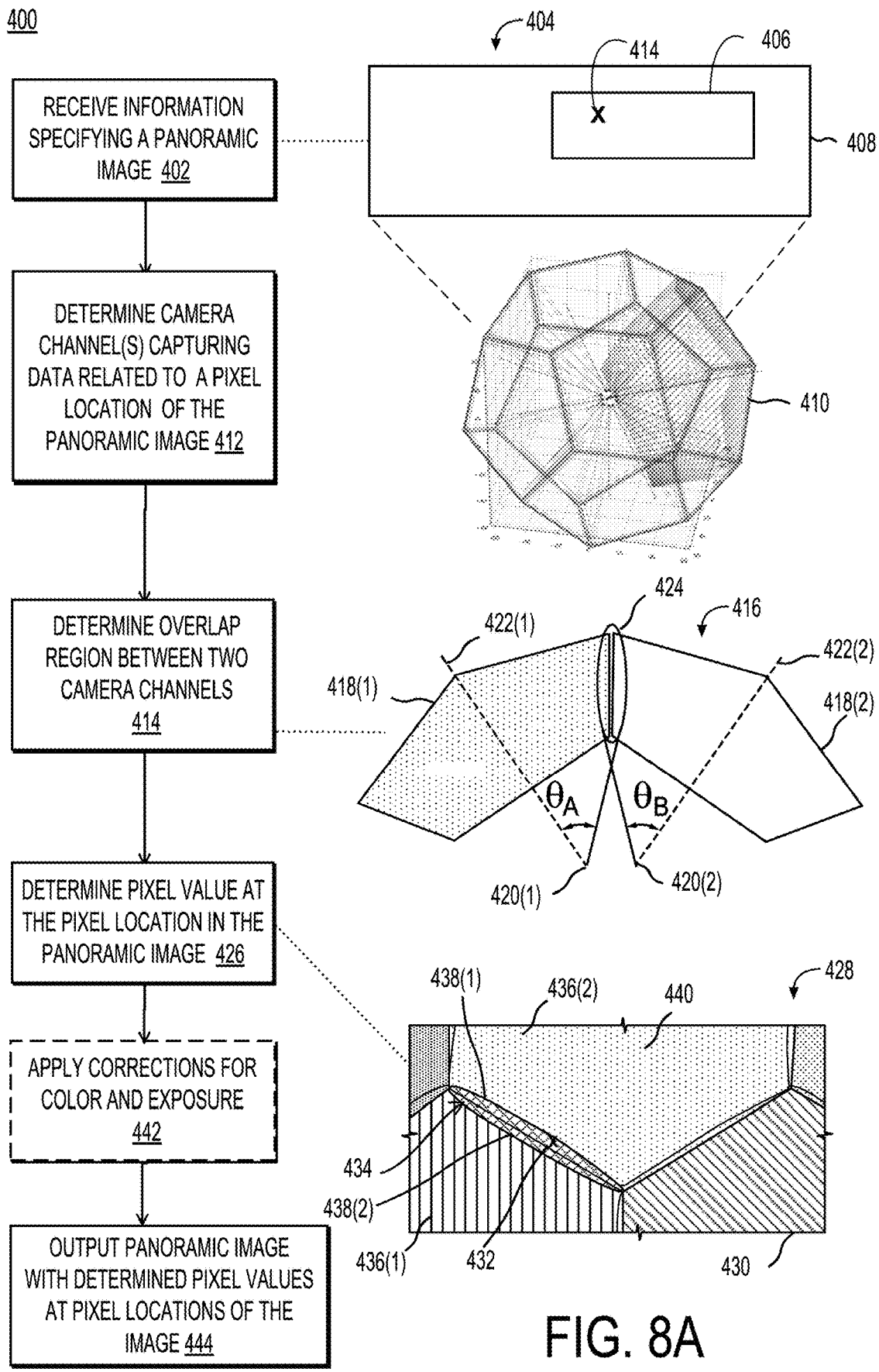
FIG. 8A depicts a pictorial flow diagram of an example process for generating a panoramic image using image compositing techniques, as described herein.
Figure 8B:
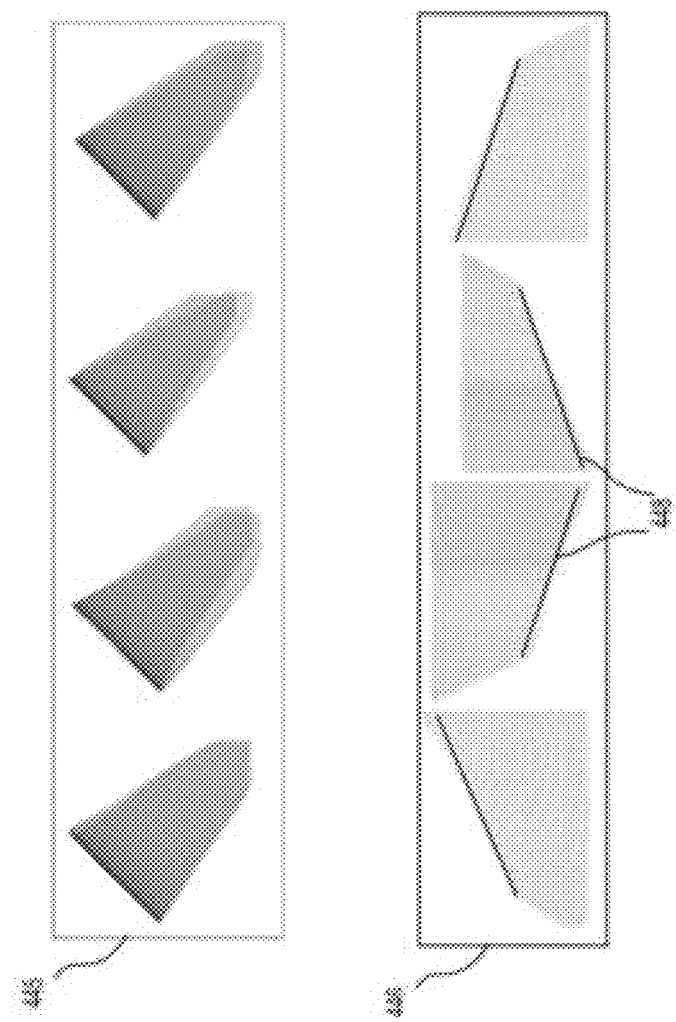
FIG. 8B depicts example plots characterizing an overlap area between camera channels.

Image Blending Procedure, Step 400:

Assign weights to each camera's pixels in the extended overlap region. For example, a linear ramp can transition from 100% camera A at one edge to 100% camera B at the other. FIGS. 8A-C detail an image blending method in greater detail, starting with process 400. For example, This may provide a relatively smooth blend, e.g., with no visible seams.

One efficient way to refine the boundary alignment between two adjacent cameras may be a binary search approach. In such an example, the algorithm chooses an arbitrary line or pixel index as a candidate seam. If the system detects an excessive overlap between the two fields of view, indicating that the seam is too far in one direction, it can randomly select another line, further out, to reduce overlap. Conversely, if the fields of view underlap and fail to meet at the seam, the algorithm can move the boundary in the opposite direction, for example, by halving the distance on subsequent attempts in a divide-and-conquer fashion. This process can continue iteratively, effectively "zeroing in" on the optimal boundary by adjusting and testing smaller and smaller segments until the overlap is neither excessive nor insufficient. By coupling this binary search procedure with a parallelism or cross-correlation metric at each candidate boundary, the algorithm can efficiently converge on a solution that yields minimal parallax and an optimal seam location, in a logarithmic fashion.

The result of this algorithm is a set of core FOVs for each camera that are optimized to produce stencils of rays whose boundary rays are effectively parallel. By applying a one-time, scene-independent calibration and alignment process, the system can directly generate seamless, parallax-free panoramas, e.g., without the need for complex scene-dependent stitching algorithms.

Figure 7:
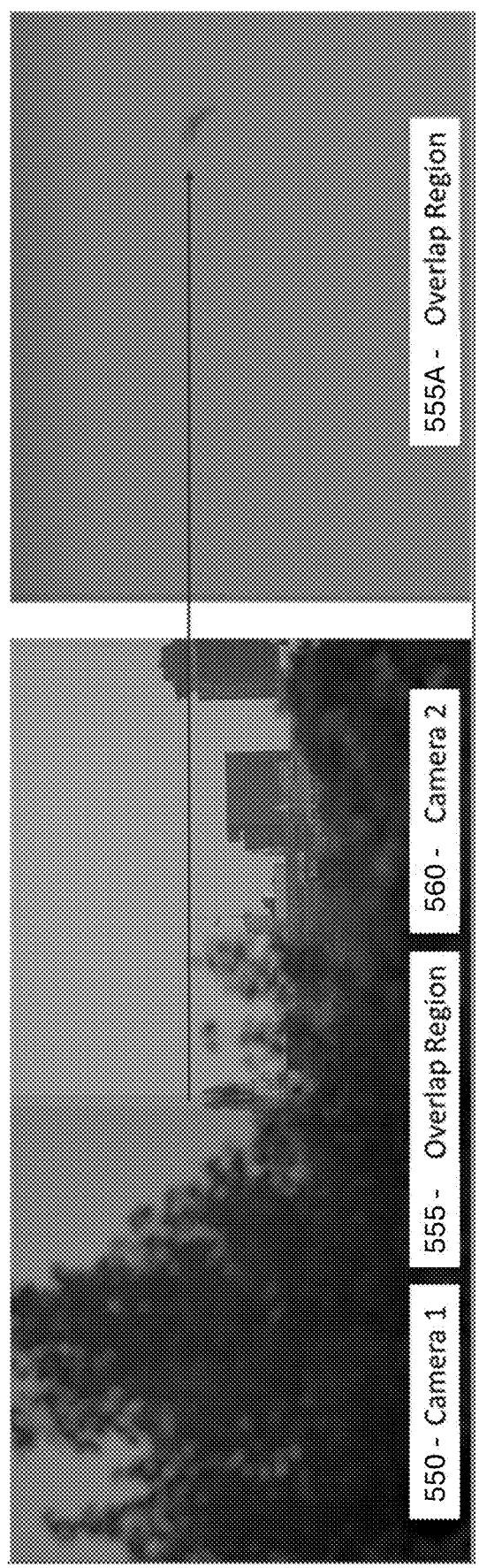
FIG. 7 depicts a final panoramic assembly, as a conceptual illustration showing multiple cameras arranged around a scene, each with a defined core and extended FOV.

FIG. 7 depicts an exemplary final panoramic assembled image collected with a low parallax multi-camera system 100. When combined, the cameras provide part of a seamless 360-degree or WFOV panoramic image, with multiple cameras arranged around a panoramic viewpoint, and with the respective core FOVs blended together seamlessly. In particular, FIG. 7 shows image content captured by two adjacent high-resolution camera, camera 1 image content 550 and camera 2 image content 560 with an overlapped image region 555. Each of the two cameras had a defined core FOV and extended XFOV, with the XFOVs providing a small overlapped FOV to support image blending. The adjacent image in FIG. 7 is a zoomed in area of a portion of the overlap region 555A in which an image of a flying bird is seen.

It should be noted that with OTS lenses, the imaged FOVs are usually polygonal (e.g., square, rectangular) out in object space (scene), but the images may be distorted at the image plane, onto the image sensor. As a defined core FOV is smaller than a camera's full FOV, including an XFOV at the perimeter, the relative image distortions may be different. But image distortion impacts within both core and extended FOVs can be corrected by calibration. For consistency, the XFOV may nominally underfill the image sensor so that the available XFOV pixel count is nominally the same versus field, regardless of distortion.

Outlier Rejection for Robust Performance

In some implementations, the algorithm for selecting the core FOV boundaries includes a confidence-based outlier-rejection procedure to guard against misleading data. While the basic method pairs up direction vectors at camera seams and iteratively refines boundaries based on dot products, real-world noise may lead to incorrect feature matches or unreliable sensor readings. Such inaccuracies, if left unfiltered, can degrade or destabilize the parallax-free alignment.

A first step in an example outlier rejection process may involve computing a preliminary boundary alignment by maximizing parallelism—typically measured via the dot product of corresponding rays. During this stage, each boundary pixel or small pixel group may be assigned a confidence weight that reflects several factors, including, but not limited to, feature-matching quality, mechanical sensor variance, and/or local scene characteristics such as glare or low texture. For instance, if a pixel's alignment relies on high-quality ORB feature matches, it may carry a higher confidence, while glare-afflicted or texture-poor regions may be down-weighted.

Next, an outlier-rejection routine, often resembling RANSAC, may discard boundary measurements that deviate substantially from the main consensus. For example, if most data converges to angles below 0.1°, but a small cluster indicates a significantly larger discrepancy, that cluster may be flagged unless it constitutes a critical mass of reliable points. Inconsistent readings from capacitive sensors may similarly be rejected if they conflict with high-confidence scene-based alignment in a localized region.

With outliers removed, the boundary alignment may be recalculated, for example, by weighting each surviving measurement by its confidence. This refined solution can inherently favor the majority of consistent data while effectively ignoring spurious inputs. If the result differs drastically from the previously accepted boundary (e.g., more than 2-3 pixels shift in image space), a temporal smoothing step can be used to interpolate changes over several frames, for example, to prevent jarring discontinuities in the final composited output.

Finally, should an excessive number of boundary pixels or sensors be invalidated, the system can revert to a fallback alignment derived from a previously successful calibration until new, reliable data may be acquired. In this way, confidence-based outlier rejection can prevent transient errors—whether from scene-based feature matching or mechanical sensor anomalies—from compromising the parallax-free boundary alignment, thereby producing robust, minimal-parallax composites.

Additional or alternative confidence-based outlier rejection techniques may also be implemented to enhance a system's resilience to anomalies or conflicting data sources. While the outlier rejection techniques just described may rely on a basic threshold or a RANSAC-like approach, an alternative technique can employ a multi-tier strategy that partitions data by their origin or reliability class, fuses them differently, and/or handles them with dynamic thresholds. In such an example, a first stage may be to classify each input measurement—whether it may be derived from scene-based feature correspondences, mechanical sensor readings, and/or direct optical axis alignment checks—into categories with specific reliability models. For instance, features matched by a robust descriptor with minimal descriptor distance might be placed into a "high-confidence feature" class, while mechanical sensor readings with large variance might be assigned to a "low-confidence sensor" class. Each class may be accompanied by a reliability function $R_i(data)$, which quantifies how likely it may be that a measurement is correct. Next, the example system may run a local RANSAC or a RANSAC-like procedure within each class. In a scene-based feature class, the process can identify inlier correspondences that agree on a particular boundary shift or parallax angle. In a sensor class, the process can similarly look for internal consistency among the sensor readings, discarding large spikes that deviate from the group. Each class thus produces a partial "vote" for boundary alignment. For instance, if the high-confidence feature class strongly indicates a boundary shift of +3 pixels with minimal deviation, whereas the sensor class suggests +4 pixels, but half the sensor readings are flagged as outliers, the system might weigh the feature vote more heavily.

Subsequently, a global integration step can be used to merge the partial results. By employing a multi-tier outlier rejection, the system can robustly handle mixed failure modes: sudden mechanical sensor noise, localized glare that breaks feature matching, and/or partial occlusions. The seam remains parallax-free under normal conditions and gracefully recovers even when certain data sources fail. Because each data source (features, mechanical sensors, parallelism checks) has its own reliability model and partial RANSAC, the integrated boundary alignment emerges from the "best of each world," ensuring minimal parallax at the final composite. This advanced module can thus provide a highly fault-tolerant approach, amplifying the novelty of the multi-camera design by guaranteeing stable, minimal-parallax imagery even in unpredictable real-world conditions.

Machine Learning Refinement

Another alternative implementation of the algorithms for finding parallax-free image boundaries may include integrating a neural network-based boundary search to enhance boundary detection beyond conventional geometric measures (such as dot-product parallelism). In some examples, a lightweight or moderately sized convolutional neural network (CNN) may be trained to examine pairs of partially overlapping images from two adjacent cameras. This CNN may be trained to infer where a parallax-free seam is likely to be located based on image features such as edges, texture continuity, and/or absence of distortion artifacts, thereby delivering a robust seam prediction.

In a multi-camera array 100, the neural network module can operate concurrently with a geometric boundary search algorithm. Specifically, the system can start with a coarse or standard boundary estimate produced by the dot product of rays (the standard parallelism criterion). Then, for each candidate boundary row (or column, depending on orientation), local patches around that boundary can be cropped from both images. These patches can then be fed into the CNN, which outputs a seam "confidence score," effectively indicating how well the local image content lines up in the overlap region. This synergy of CNN-based and geometry-based alignment may be especially effective when imaging close object distances, further in than the EP offset between telescopic imagers may be designed for, to provide a more robust image blending in these edge cases.

Runtime considerations may also be addressed for real-time or near-real-time panoramic blending. For instance, if the multi-camera array application demands 30-60 frames per second, the CNN can be designed to be light (fewer layers) or run on dedicated hardware such as a GPU or an AI accelerator. Certain frameworks, including TensorRT or ONNX Runtime, can optimize inference speed so the CNN-based step does not become a bottleneck. Moreover, temporal filtering can be applied to the neural predictions, meaning the network only fully updates boundary suggestions every N frames, while intermediate frames rely on partial refinements. Overall, the neural network approach can enhance the reliability of the parallax-free boundary selection by combining learned image-based cues with standard geometric alignment. By embedding a CNN trained to spot visual discontinuities directly indicative of parallax or seam artifacts, the system can ultimately yield a more stable, minimal-parallax composite image without needing labor-intensive, scene-specific post-processing, including for very near imaging.

Calibration with GPU Acceleration

Some aspects of this disclosure may also implement a GPU-accelerated parallel threshold search that performs a brute-force or semi-brute-force search for the optimal seam location in parallel across many candidate boundary positions. Traditional iterative or gradient-based methods adjust the boundary step-by-step, which may be efficient but sometimes fails to find the global optimum if the alignment function has local minima or abrupt transitions. By harnessing a GPU's ability to execute thousands of threads simultaneously, the system can evaluate multiple boundary candidates in one pass, drastically reducing the time to converge on the best alignment. For example, a GPU-based approach can robustly find the globally optimal seam at each time step, while limiting total computational load and ensuring minimal parallax for the composited images. This method may be particularly beneficial for real-time boundary adjustments due to mechanical shifts in the field, but it can also speed up calibration in a laboratory setting as well.

Extended FOV and Image Blending

Relative to the imaging systems with lenses designed to control parallax and perspective errors, or low-parallax telescopic-type lenses, with a limited extended FOV or overlap region, image stitching can be nominally unnecessary, and image blending can suffice. However, there may be value in applying an optimized image blending method, examples of which are described with reference to FIGS. 8A and 8B. Image blending particularly may have value when the overlap region 308 spans from near the edges of an extended FOV 310 into the core FOVs 306 of the adjacent cameras (e.g., as shown in FIG. 8B). Again, in examples, it may be preferable to have the extended FOV 310 be larger than the core FOV 306 by ≤1%, although the overlap region may be larger yet (in degrees or pixels). After image blending is completed, the images can be further cropped down from the size of the extended FOV 310 to the core FOV 306, and then aligned and abutted or tiled to form a composite image.

In examples of the present disclosure, panoramic images (e.g., using equirectangular projections) may be generated from image data captured by multiple camera channels corresponding to the cameras of a multi-camera device 100. In such panoramic images, pixel values in the overlap regions between camera channels may be determined by blending the image data from different cameras to smoothly transition between cameras as the view traverses the overlap region. For example, the contribution of each camera channel to the pixel values in the overlap region may be varied such that there may be a smooth transition from one camera to another within these regions.

FIG. 8A is a pictorial flow diagram illustrating an example process 400 for generating a panoramic image from a plurality of images of a scene as captured by a multi-camera system. In particular, the process 400 may be utilized for blending images in a region of overlap between camera channels. In examples of this disclosure, the multi-camera system may be a low-parallax camera system such as the device 100 of FIG. 1 with a dodecahedral system configuration, or it can be a visor type system, or it can be a system with small FOV (e.g., <10 deg half FOV) optics, or with telescopic type optics as depicted in FIG. 2A.

At an operation 402, the process 400 may include receiving information specifying a panoramic image to be generated. As shown in an example 404, a panoramic image 406 may be specified by indicating an extent covered by the panoramic image 406 within a projection image 408 of the scene captured by the multi-camera system. The panoramic image 406 may be specified as an equirectangular projection, creating a rectangular image as shown. In other examples, the panoramic image 406 may be represented as a cube map. In the example 404, the multi-camera system may be represented by an idealized dodecahedral projection geometry 410, where each face of the dodecahedron represents a camera channel. The projection geometry may be used to convert input data from multiple camera channels of the multi-camera system to the output format of the panoramic image 406. For example, the input data may be in a spherical format (e.g., a near 360-degree image) matching the multi-camera system geometry (e.g., dodecahedral), and the equirectangular output format 408 may be obtained by a projection (e.g., Mercator projection) of the input data into the final format desired (e.g., equirectangular).

In some examples, the conversion from the spherical format to the equirectangular format may be accomplished by iterating over every pixel of an output equirectangular image, such as the panoramic image 406 or the entire projection image 408. For example, for each pixel of the equirectangular image, the angle (theta and phi) the pixel corresponds to may be determined by mathematically projecting the pixel location as a ray vector piercing the ideal dodecahedron corresponding to the input format. As a result, ray vector data can be determined for every pixel as pinhole location [x,y,z] and angle [theta, phi]. Where a ray vector intercepts a field-of-view (FOV) of only one camera channel, the process 400 may output the pixel value from the image data of the one camera channel directly onto the equirectangular image 408. It is noted that the pixel values of the image data may be modified by the predetermined radiometric, photometric, and geometric (intrinsic and extrinsic) calibration values associated with the camera channel. For example, a chromatic response of each camera channel may be determined during a factory calibration process. As an example, light from a nominally uniform white light source can be projected over the entire field of view. If the entire FOV is not covered, multiple images can be tiled together. The chromatic response of the camera channel may be measured to correct for color response and vignetting throughout the FOV. The chromatic response can be stored in a 3×3 matrix that may be later used to correct for vignetting and color response in real-time for each pixel.

At an operation 412, the process 400 may include determining camera channel(s) capturing data related to a pixel location of the panoramic image 406, such as the pixel location 414. The camera channel(s) which have valid image data to contribute to the projection at the pixel location 114 may be determined when creating the equirectangular projection 408 from the image data captured by the camera channel(s) of the multi-camera system, as described above. As another example, the pixel location 414 may be mapped (e.g., as a latitude and longitude) to the spherical format of the dodecahedral geometry 410, and the camera channel(s)

determined as those camera channel(s) whose field-of-view (FOV) include the mapped location of the pixel location 414. In the example multi-camera device 100, if the pixel location 114 is within an area of overlap, then up to three camera channels may capture image data corresponding to the pixel location 114. However, with other multi-camera configurations, the number of cameral channels with overlapping image data in overlap regions may vary.

In some examples, the residual parallax and perspective differences across a projection geometry, such as the dodecahedral geometry 410, can be used to modify a vector space mapping, based on a model of the residual parallax, which provides knowledge over every pixel, and where it nominally maps in object space, to very small error. Lenses with limited parallax enable cameras closer to the software idealization. However, for pertinent applications, the data for the known variation in residual parallax or perspective error for these lenses, along a polygonal lens edge or polygonal image alignment, within an overlap FOV region or XFOV, can be used to determine deviations from the idealized virtual pinhole. The previously noted polynomial or a spline curve fit model of the shape of a COP curve versus field, at least along a polygonal edge, can be used to describe deviations of the idealized virtual pinhole relative to position or field angle. The COP location can be shifted not only with respect to the optical axis (+/−z), but also perpendicular to the optical axis (+−−y), to better model pupil comatic aberration. These angular differences equate to sampling differences of the light beam collected and imaged from an object, or a portion thereof, that is located at or near the edge of the imaged field. The angular differences in light reflected off an object feature and collected or sampled by the imaging lens, can depend on differences in the surface light reflectivity or absorption and the incident plenoptic light that illuminates it. During the process 400, each camera channel can be treated as having its own virtual pinhole location, that is typically different from the camera center location which could be defined as (0,0,0). In this example, the data from each channel may be processed to transform it from its virtual pinhole viewpoint to the camera center viewpoint. This adjusts for angular position such as theta, phi, in a spherical co-ordinate system.

At an operation 414, the process 400 may include determining an overlap region between two camera channels containing data related to the pixel location 114, as determined at the operation 412. In an example 416 shown, the two camera channels may comprise a first camera channel 418(1) and a second camera channel 418(2). The two camera channels 418(1), 418(2) may be associated with camera configuration data indicating idealized virtual pinhole locations 420(1), 420(2) and direction vectors 422(1), 422(2) corresponding to the respective camera channels 418(1), 418(2). The process 400 may determine an overlap region 424 between the camera channels 418(1) and 418(2) based on a known FOV (or an extended FOV) angle (e.g., as shown by angles $\theta_A$ and $\theta_B$).

At an operation 426, the process 400 may include determining the pixel value at the pixel location 414. As shown in an example 428, a portion 430 of the projection image 408 may include the pixel location 414 at a location 432. The portion 430 includes projected portions of image data from multiple camera channels of the multi-camera system, illustrating regions of overlap between them, and illustrates geometrical considerations used in determining weighting factors associated with the camera channels. In the example 428, the location 432 may fall within an overlap region 434 of the camera channels 418(1), 418(2). Image 436(1) captured by the camera channel 418(1) and image 436(2) captured by the camera channel 418(2) both include respective pixel values at the location 432, and may contribute data to the determination of the pixel value at the operation 426. For example, the image 436(1) may have a first pixel value at the location 432 and the image 436(2) may have a second pixel value, which may be different from the first pixel value, at the location 432.

When projected onto the surface of an imaginary sphere surrounding the multi-camera system, the overlap regions (e.g., the overlap region 434 shown) are roughly elliptical. However, modeling the perimeters of the overlap regions mathematically may be challenging. Instead, for any point within the overlap region, such as the location 432, the process 400 can calculate an angle characteristic at the point as the field of view (FOV) angle for each camera channel (e.g., 418(1) and 418(2)) at that point. For example, the process 400 can determine the dot product between a first directional vector, from the virtual pinhole location (420(1), 420(2)) of the respective camera channel to a point on the surface of the imaginary sphere corresponding to the location 432, and a second directional vector of the optical axis of the respective camera channel (e.g., vector 422(1), vector 422(2)). Since the dot product of two unit vectors is equivalent to the cosine of the angle between them, the arccosine of the dot product between the first directional vector and the second directional vector is the angle (in radians) corresponding to the angle characteristic at the location 432 for the respective camera channel. Within the FOV of each camera channel, such as the camera channels 418(1), 418(2), the angle characteristics of locations in the overlap region may range from about 29 degrees to 38 degrees, in some examples.

As an illustration, FIG. 8B shows plots 445 of angle characteristics for example locations within an overlap region, where the angle characteristic with respect to a first camera channel is plotted on a first axis and the angle characteristic with respect to a second camera channel is plotted on a second axis. As shown, the angle characteristic for locations in the overlap region computed for each camera channel is high at the extreme ends of the overlap region and is relatively low near the center. Because of this, the illustration appears to "fold over" the overlap region. This effect makes the asymmetry of the overlap regions evident. It is also to be noted that the two halves of the first and last example appear to be roughly aligned while the two examples in the middle are not. This may be due to a very small displacement of the camera channels along their shared boundary. Further, some of the overlap regions may be narrower than others due to differences in the overall angle between the view angle of the respective cameras, and some of the overlap regions may be narrower at one end than the other due to a slight rotation of the camera channels with respect to each other. In addition, some of the overlap regions may be narrower at one end than the other due to both pupil spherical aberration (PSA) and to slight rotations of the camera channels with respect to each other.

Further, for each camera channel pair 418(1), 418(2) that has an overlap region (e.g., the region 434), a plane may be defined using three points: the origin of the camera system, at a (non-zero) point along the optical axis of camera channel 418(1), and at a (non-zero) point along the optical axis of camera channel 418(2). When characterizing an overlap point (e.g., the location 432), it may be determined whether it is above or below this plane. This may be done by calculating the dot product of the vector from the origin of the multi-camera system to its location on the imaginary sphere and the surface normal vector of the plane that bisects the overlap region. The sign of the dot product indicates whether the overlap point is above or below the plane. The magnitude of the dot product, which is the distance to the plane, is unused. By using the sign of the point with respect to the bisecting plane and the sign of the difference between the FOV angles to each camera, an overlap region (e.g., the region 434) may be categorized into four region quadrants. FIG. 8B illustrates four quadrants 446 of an overlap region. As shown, the edges 448 of the region quadrants are essentially linear when expressed in units of angle, which means that the shape of each region quadrant may be expressed with one, or two, line segments. Since the end portions of the overlap regions may be quite small, the shape of the quadrant may be modeled with a single line. This means that each overlap region may be described with eight parameters, the slope and intercept for the boundary line of each region quadrant.

In some examples, at the operation 426, the process 400 can determine a distance (which may be an estimate) of the location 432 from an edge of the overlap region for each image 436(1) (e.g., edge 438(1)) and image 436(2) (e.g., edge 438(2)). The process 400 may determine weights for each image 436(1), 436(2) based on the distance (e.g., the weights may be inversely proportional to the distance). In some examples, additionally or alternatively, the distance may be computed as a distance or an estimated distance from a center of the image 436(1) and 436(2) (e.g., center 440 of 436(2) shown). In some examples, the pixel value at the location 414 may be determined as a weighted average of first pixel value of the image 436(1) and the second pixel value of the image 436(2) at the corresponding location 432. In other examples, the pixel value at the location 414 may be determined by stochastic sampling of the images 436(1), 436(2), where a probability of sampling from an image may be based on the weight corresponding to the image. Aspects of the operation 426 are described in further detail with reference to FIG. 5C.

In some examples, the process 400 can determine the pixel value at the operation 426 based on content of the image data in the overlap region. As an example, a frequency signature may be determined for an area of the images including the overlap region indicating whether the overlap region includes high-frequency content (e.g., edges, texture, etc.) or low-frequency content (is relatively flat or uniform intensity and/or color). Different methods of combining the images 436(1) and 436(2) may be applied based on the frequency signature. For example, if high-frequency content is indicated, the process 400 may apply the stochastic sampling method described above to determine the pixel value, to represent such content more accurately in the panoramic image. Whereas, if low-frequency content is indicated, the process 400 may apply the weighted average method described above to determine the pixel value. As another example, the content of the image data may include a flare or a veiling glare, and the process 400 may determine the pixel value to compensate for the presence of the flare or the veiling glare, as discussed below.

In some examples, the process 400 can determine the pixel value at the operation 426 based on whether an object or feature of interest is present in the overlap region. As an example, the process 400 may only determine the pixel value at the pixel location, as described above, if the pixel location is within an area (e.g., an ROI) covering the object of interest. Whereas, if the pixel location is not within the area covering the object of interest, the process 400 can simply determine the pixel value as the first pixel value or the second pixel value. In some examples, in an optional operation 442, the process 400 can adjust an intensity level or color of the pixel value to apply corrections for color and exposure differences between camera channels.

In some examples, multiple models can be blended together where blending in the context of Artificial Intelligence (AI) refers to the process of combining the outputs or predictions of multiple models or algorithms to improve the overall accuracy or performance of the final result. Additionally, AI can also be used to analyze the lens used to capture the images and automatically apply the appropriate correction algorithm based on the lens's characteristics and the type of front color present in the image. These techniques require a substantial amount of high-quality data and computational power to train and use these models, but once trained and fine-tuned, these AI models can be very effective in correcting lateral color aberrations in images. In some examples, deconvolution techniques may be used to compensate for image quality degradation, if needed. Deconvolution is a mathematical technique used to restore or improve the image quality for images that have been degraded by a blur or convolution process.

A multi-camera system can also experience different types of flare, glare, and/or ghost light. In general, veiling glare is caused by scattering in lens elements, reflections off the lens barrel, reflections off lens surfaces, and reflections from the sensor surface itself. The 2D function describing the intensities is known as the glare spread function (GSF) of the lens. In general, glare in a lens image can be reduced by post-processing using a deconvolution method. However, in some examples, glare may not be caused by visible scene features, and instead be caused by light entering the device from outside of its field of view. For example, two adjacent camera channels can experience a different uniform or non-uniform background flare that is caused by the different camera lenses being pointed at different light sources. As these flare-based image differences can extend to the image edges, it can cause uneven color and luminance responses along the blended image edges in the overlap region of two adjacent camera channels.

Veiling glare can be compensated for optically using premium anti-reflective (AR) coatings, reducing the size of the aperture, using fins on the periphery of outer lens elements to limit the amount of stray light that could enter the camera from outside its field of view, and through careful design of the lens to control for stray light. It may also be compensated for in software by identifying areas of the image that may be affected by veiling glare, and applying a correction to improve the contrast and reduce the overall impact of glare. In addition, HDR imaging can be applied to generate imagery with a high dynamic range to capture both the bright and dark areas of a scene without overexposing the highlights or underexposing the shadows.

In some examples, the process 400 can be adapted for use in scenarios in which imaging algorithms for creating equirectangular projections are imbedded in a field programmable gate array (FPGA) or other comparable processor, by implementing ongoing or on-demand pixel projection recalculation. The pixel values can be rapidly recalculated with little memory burden in real time. As another alternative example, the process 400 may evaluate the overlap regions and using a "grassfire" based algorithm to control the blending between the images 436(1), 436(2) in the overlap regions. The grassfire algorithm may be used to express the length of the shortest path from a pixel to the boundary of the region containing it, and may be used in conjunction with precomputed grassfire mapping LUT. However, the LUT may require significant memory when creating the panoramic image from the image data.

FIG. 8C illustrates an example process 450 for determining weights corresponding to each camera channel to be used in combining data from respective camera channels in an overlap region, as described with reference to the operation 426 of the process 400. At an operation 452, the process 450 includes determining, for a location (e.g., corresponding to a pixel location in a panoramic image), angle characteristics for each camera channel contributing data to the location. For example, the process 450 may determine a first angle characteristic with respect to a first camera channel and a second angle characteristic with respect to a second camera channel, as described with reference to FIG. 8A.

At an operation 454, the process 450 includes determining a distance of the location to a bisecting plane, an average, and a difference between the first angle characteristic and the second angle characteristic. The bisecting plane may be defined based on three points comprising: the origin of the camera system, a (non-zero) point along the optical axis of the first camera channel, and a (non-zero) point along the optical axis of the second camera channel. The process 450 may determine the distance of the location to the bisecting plane, and whether the location is above or below the plane (e.g., a sign of the distance may be negative or positive based on whether the location is below or above).

At an operation 456, the process 450 includes determining, based on the sign of the distance and the sign of the difference between the first angle characteristic and the second angle characteristic, a set of quadrant parameters. For example, the region quadrant corresponding to the location may be determined based on the sign of the distance and the sign of the difference, as described with reference to FIG. 8A, and the set of quadrant parameters may be determined based on the region quadrant corresponding to the location.

At an operation 458, the process 450 includes determining estimated distances to the edge of the overlap region of the first camera channel and to the edge of the overlap region of the second camera channel, based on the quadrant parameters determined at the operation 456.

At an operation 460, the process 450 includes determining weights corresponding to the first camera channel and the second camera channel based on respective estimated distance to the edge of the overlap region for each camera channel, as determined at the operation 458.

As noted previously, the simplifying assumption that a camera lens system can be represented by an ideal virtual pinhole may be typically used in modeling the camera. However, the multi-camera device (such as the device 100) and corresponding lens systems described herein may be designed or analyzed with explicit knowledge of parallax or perspective. This knowledge may be used for imaging applications such as photogrammetry, or aircraft collision avoidance, where imaging accuracy may be important, and the known variation in residual parallax or perspective error along a polygonal lens edge or polygonal image FOV edge represents the known deviation away from the idealized pinhole assumption.

Core FOV and Extended FOV Design Considerations (Optics and Mechanics)

In many implementations, a deliberate choice may be made to have each camera's field of view (FOV) slightly underfill or overfill the image sensor to ensure robust coverage for both the core field of view (core FOV) and the extended field of view (XFOV). Typically, a core FOV may be requested to fall within an inner area of the image sensor that is about 1-2% smaller in both height and width than the total active pixels (H×V). This "shrink" may ensure that the core FOV is safely contained on the sensor even if the focal length deviates from nominal due to manufacturing and/or assembly tolerances.

On example may include defining a constraint at the mid-edge (ME) of the image—for example, setting zero distortion at the right mid-edge pixel in the image sensor layout—while targeting a specific lens focal length. This is shown in further detail in FIG. 3A, where an example image sensor has a width of 8192×8192 pixels, each being 2.5 microns. The full field is set to zero distortion at the image edge (10.24 mm). Because actual focal length might vary, the system can ensure that, regardless of small shifts, the core FOV will always fit on the sensor. Any remaining margin around the core region then naturally forms the XFOV, which can vary from lens to lens and even along different edges of the same lens, allowing for a budget for alignment and optical tolerances.

When designing a custom optical system, one example approach may be to aim for roughly 2% underfill of the active sensor area. By doing so, the manufacturer accounts for slight variations in focal length and alignment. Chief rays associated with the target FOV may be laid out to strike pixels within this inner boundary of the image sensor. As a result, even if the effective focal length ends up slightly shorter or longer than nominal, the core FOV still maps onto valid sensor pixels without spilling outside. Any extra coverage beyond the core boundary then constitutes the XFOV. In practice, the XFOV might end up being anywhere from ~0.5% to 2.5% larger than the core FOV, and may differ around the perimeter depending on local variations in assembly or lens geometry.

By contrast, when integrating off-the-shelf (OTS) lenses, the system designer often encounters a situation where the native lens image circle slightly overfills the sensor, as shown in FIG. 5A (sometimes up to 10% more than the sensor diagonal). Rather than modifying the lens design itself, the calibration module simply identifies which set of pixels lies within the well-corrected zone of the lens and designates that rectangle as the core FOV. Additional pixels around this core region constitute the XFOV. Because each lens may differ, some cameras might see a larger or smaller XFOV region depending on the actual focal length and alignment outcome. In either case—custom or OTS lenses— the essential principle may be to ensure the boundary rays for each camera's core FOV align nearly in parallel with those of the adjacent camera at the seam, thereby minimizing parallax.

Lens Barrel Mechanics

As noted previously, in these multi-camera systems with small FOVs and low parallax, in which improved image blending can be applied, the optics can be off-the-shelf (OTS), but the opto-mechanics/lens barrels may not be. For example, most cameras are not designed to enable adjacent camera to camera alignment mounting, for mechanical integrity and robustness, for mechanical dynamics (kinematics), and/or for monitoring the relative positioning (e.g., with position sensors). A multi-camera system according to aspects of this disclosure may be mounted within a vehicle, aircraft, space craft, or ship, or mounted to a fixed structure. For example, the system can be subject to external perturbations caused by the vehicle or the environment the vehicle is traversing. Thus, in such multi-camera systems, the optics can be OTS or commercial standard, but the lens barrels or housings can have custom features to enable accurate or robust camera-to-camera mounting and alignment.

Figure 9:
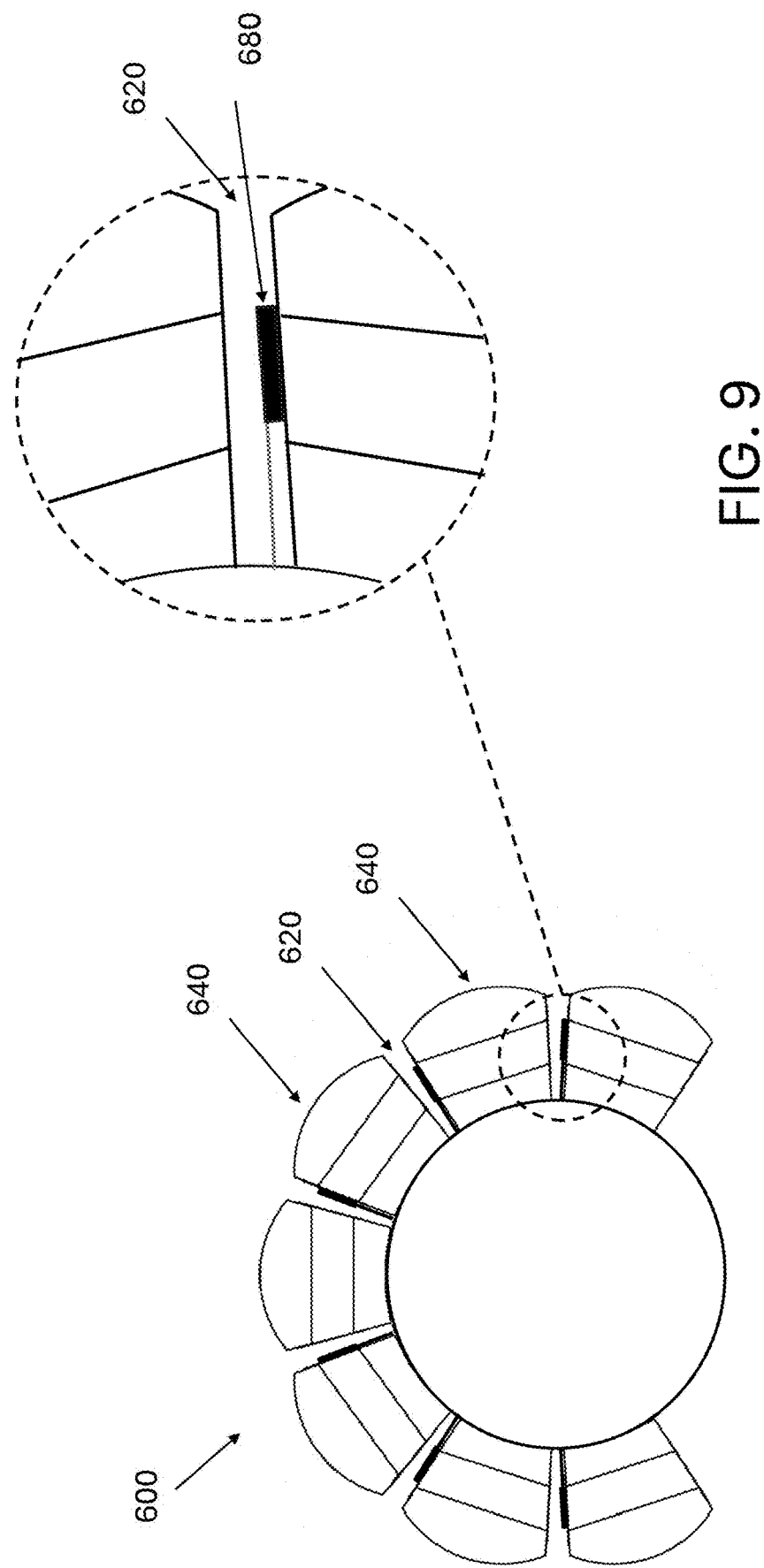
FIG. 9 depicts a plan view of an example visor type multi-camera system with a closeup of a seam between a pair of adjacent camera channels.

FIG. 9 depicts a cross-sectional view of an example alternate single row, visor type multi-camera system 600 with an accompanying exploded view of a mechanical gap or seam 620 between a pair of adjacent low-parallax camera channels 640. In this example, a distance measurement sensor 680, such as an inductive or capacitance proximity sensor, can be used to monitor the width of a seam 620 between adjacent camera channels 640. The sense plate in the sensor forms a capacitor with the adjacent channel, which would vary with the distance to the object. This capacitance formed by the sensor plate and channel determines the frequency of the oscillator, which may be conditioned into an output that can be monitored.

A capacitive distance or proximity measurement sensor 680, for example from Balluff Inc., may include an oscillator, signal conditioning capabilities, an output driver, and a controller. For example, a seam width can change dynamically due to the impacts of residual shock or vibrations that have leaked through the vibration isolation, and if provided, also through paired kinematic features and nesting force mechanisms, to cause a change or displacement from the nominal seam width. However, a distance measurement sensor 680 can provide real-time seam width data, which can then be analyzed to determine relative changes on an instantaneous or time-averaged basis. Also in some examples, multiple distance measurement sensors 680 can be provided in a seam 620 to provide data on changes in tilt(s) between adjacent camera channels 640. The resulting data can be used by the calibration module to dynamically modify the extrinsic calibration or image blending operations that can be applied to the image data coming from adjacent cameras 640. Furthermore, any changes in the values obtained during system operation can be used as feedback for recalibration. For example, distance sensors 680 can be inserted in gaps smaller than 1 mm with accuracy in the tenths of microns.

Broadly, sensors, including position sensors (e.g., capacitive) can be used in the seams or gaps between adjacent camera channels, to sense mechanical changes in relative distance, position, tilt between adjacent cameras, as can be caused by perturbations (e.g., shock, vibration, thermal) or deformation. These changes may be translated into measured changes of mechanical tilt or distance between cameras, e.g., by the calibration module, into pixels. The image blending, such as weighting values, can be modified or adapted accordingly. The frequency or timing of the image blending changes in response to the frequency or timing of the measured mechanical distance or tilt measurement changes can be reduced. For example, threshold criteria related to distance changes or tilt changes, or the frequency and timing thereof, can be used to reduce the immediacy of any extrinsic re-calibration or image blending changes (e.g., weighting factors), via modifications to the image weighting for image blending process 450 of FIG. 8C. Alternately, the image processing module can be used to sense changes in the scene, for example using optical flow, to extract information about sensor motion or vibration. In particular, some key features in a scene can be defined as benchmarks, for example that reside at or near a seam or FOV overlap region, and particularly on either side of a FOV overlap. Relative changes in image position or skew between nearby features can be used to identify and measure the effects of mechanical perturbations, and determine corrective values. In response to the detected perturbations, calibration modifications and blending modifications can be implemented in synchrony or asynchronously, at different time intervals.

Methods for Refining Calibration In-Field

In many multi-camera systems, physical or environmental factors can induce slight shifts in camera orientation or optical alignment over time, which in turn can produce parallax artifacts at boundaries where adjacent camera images meet. Thermal expansion, vibration, and mechanical stress may be common sources of incremental misalignment, even in low-parallax systems.

Therefore, it may be advantageous to equip a multi-camera system 100 with compensating means. By continuously monitoring key mechanical parameters—such as relative seam widths between adjacent lens barrels measured by capacitive or inductive sensors—small mechanical deviations can be detected and quantified. For instance, if the seam width between two cameras alters by more than a specified threshold, the calibration module updates the extrinsic parameters associated with the affected cameras. Once the new extrinsics indicate a shift in the angle of boundary rays, the image processing module refines or repositions the core FOV boundaries to restore near-parallel stencils of principal rays across adjacent seams. This real-time or near-real-time recalibration can be performed locally, focusing only on a boundary region under stress rather than recomputing alignment for the entire multi-camera array. In some implementations, a gradient-free optimization or a small grid search can be applied to boundary pixels in the overlap region to ensure maximum dot-product alignment of direction vectors, preventing unnecessary computation across all image pixels. The module can also employ temporal smoothing: once a new boundary alignment is determined, it can be phased in over a few frames to avert abrupt changes in the composited output.

When a system detects variations beyond a specified threshold (e.g., 10 μm in seam width, or a 0.2° shift in tilt), the calibration module flags the image processing module to recalculate or refine extrinsic parameters (rotation R, translation t). If the newly computed extrinsic parameters indicate that the boundary pixels' rays are no longer parallel at the seam, the image processing module can shift or resize the core FOV rectangle in each camera to re-align them. This ensures that the sets of rays at the shared boundary remain parallel within a small angular tolerance (e.g., <0.1°), mitigating parallax.

The system can operate on adaptive schedules, performing partial or full boundary recalculations at intervals determined by the frequency or magnitude of measured changes. For example, if only a minor mechanical shift occurs, a localized boundary adjustment along a specific row or column of pixels may suffice, whereas larger shifts can prompt more extensive recalibration steps (e.g., repeating the iterative refinement from an "initial guess" for the boundary).

To avoid excessive computation, the dynamic boundary adjustment algorithm can track only a subset of boundary pixels or fiducial features along a seam. These fiducials can be tested for parallelism, and adjustments may be made only if the parallax error exceeds a threshold in real-world units or pixel offsets. This dynamic reconfiguration can also help in low-light or flare scenarios, where one camera might temporarily provide superior image quality in an overlap region. The system can then shift the boundary to favor that camera until lighting conditions improve.

In one implementation, at each processing cycle (e.g., every n frames), the calibration module can compute the dot product of direction vectors in a region around the seam. If the average parallelism metric drops below a desired threshold (e.g., 0.9995), the system can shift boundary pixels by a small offset, say ±2 pixels, and recalculates the parallelism measure. This proceeds iteratively until an improved alignment is found or a maximum iteration limit is reached.

For configurations where only certain seams or cameras can be affected (e.g., strong vibration localized to one portion of an array), dynamic boundary adjustments can target a single seam or a limited set of seams rather than recalculating the entire multi-camera array. The system can compensate for ongoing shifts—such as thermal expansion throughout the day—by fine-tuning boundaries in real time. This prolongs the operational effectiveness of multi-camera devices, particularly those deployed in outdoor or mobile environments.

Additionally, changes in scene content can be leveraged for adjustments to the core field-of-view (FOV) region: if a highly detailed object of interest moves close to a seam, it enables feature points to latch onto for help in detecting or confirming mechanical miscalibration. When objects with significant texture appear in the seam and reveal misalignment, this usually indicates that the cameras have shifted relative to one another (e.g., via vibration or thermal variation) and need recalibration or boundary refinement. In other words, the image blending remains the same regardless of object distance, but scene features can highlight mechanical shifts that disrupt parallelism at the seam.

The monitoring of scene content can be performed in place, or in addition to mechanical sensor data, which provides a rough extrinsic pointing solution. By combining both, the system can achieve robust, finely tuned extrinsic pointing where mechanical measurements alone might be insufficiently precise. Indeed, the mechanical approach can determine an approximate alignment, but features in the actual scene serve to fine-tune extrinsics further, minimizing parallax artifacts.

This method of using scene data for extrinsic refinement may be particularly effective in feature-rich environments where robust keypoints can be consistently extracted, ensuring accurate detection of alignment drifts even in the absence of significant mechanical sensor readings. After identifying these keypoints in each camera's raw video feed, prior to blending, the system correlates matched feature points in the overlapping region and then references each point's original IFOV direction vector (computed from the known intrinsics and extrinsics). If the newly observed direction of a given feature in one camera differs from its corresponding direction in the adjacent camera by more than a preset threshold, this discrepancy indicates a shift in the extrinsic alignment.

Formally, let $r_p^{(A)}$ and $r_p^{(B)}$ be the direction vectors for the same feature point as captured by cameras A and B, respectively. The difference in angle between these two vectors (e.g., via dot product or arc cosine) reveals how much the extrinsics have changed. The algorithm aggregates these differences for many feature points along the seam boundary to build statistical confidence. If the RMS sum of these boundary discrepancies exceeds a specified limit (e.g., 1-2 pixels of projection error or 0.1° of angular difference), the system can conclude that a parallax-inducing shift has occurred. In response, it triggers a recalibration or boundary refinement routine to realign the cameras. In some implementations, the system refines the extrinsic calibration dynamically over time by leveraging scene-based feature matching across overlapping fields of view. Specifically, each camera detects and tracks feature points in its image; once features from Camera A and Camera B are successfully matched, the corresponding pixel coordinates may be transformed into direction vectors using each camera's intrinsic calibration and compared with prior known truth reference. This approach ensures that geometric consistency drives the extrinsic alignment process.

Using an approach of RMS summation of boundary misalignment can also help detect parallax errors that can accumulate slowly over time or arise from sporadic mechanical perturbations. By continuously tracking these potential errors across frames, the system can decide when a full recalibration is warranted versus when minor boundary adjustments may be enough. This selective, data-driven recalibration process ensures minimal parallax artifacts while limiting computational overhead.

These dynamic adjustments enable the system to provide consistent, minimal-parallax imagery even under conditions of ongoing mechanical perturbation or significant scene changes. By only recalibrating or shifting core FOV boundaries when necessary—based on either mechanical sensors or scene-based feature tracking—the system can minimize computational overhead and ensures the multi-camera array can maintain high-quality blending in real time or near real time.

In scenarios where the multi-camera system 100 captures sequential frames—essentially video streams rather than static images—temporal difference alignment addresses the question of how to preserve parallax-free seams across time. Instead of recalculating the boundary from scratch for each new frame, the method leverages knowledge about how the cameras (and possibly the scene) move from frame to frame. By focusing on incremental updates, the system can maintain high frame rates while preserving parallax-free seams. Conceptually, at frame t−1, the system has already established a boundary alignment. This boundary remains valid unless there is evidence of mechanical perturbation or scene shift. At frame t, the system estimates how each camera's orientation or position has changed, which might be derived from an inertial measurement unit (IMU) or from optical flow computations that track how features shift across frames. If the cameras are relatively static, the boundary requires little or no modification. The system can simply reuse the seam from frame t−1. However, if the sensors or optical flow detect a modest shift, the system performs a localized search around the previous boundary. For instance, it can check ±5 pixels in the vertical or horizontal direction to see if a slight boundary adjustment better satisfies the parallelism criterion. Because the search is small, it executes quickly, thus preserving real-time throughput even with multiple cameras. The algorithm revert to a broad boundary search if the shift is unexpectedly large—perhaps indicating that a camera was bumped or a major mechanical reconfiguration occurred.

One advantage of this incremental approach may be that it can also exploit temporal smoothing in the scene. If objects at the seam have changed slightly, the system can compare the new scene content with previous frames to confirm that the boundary remains valid. In so doing, the approach can automatically adapt to slow or moderate scene motion while detecting abrupt motion that might require more robust re-evaluation. An example workflow might involve a multi-camera rig on a ground vehicle traveling through an environment. From frame to frame, the mechanical alignment among cameras shifts only by small vibrations or normal dynamic sway. The system initially performs a full boundary alignment at frame 0 (or after a mechanical reset). Then, for each subsequent frame, an IMU or gyroscope reading indicates rotation 80 and translation St. Using that approximate transform, the system projects the prior boundary to the new coordinate frame, checks local parallelism, and adjusts a few pixel rows as needed. This approach yields minimal computational overhead compared to re-running a large alignment routine from scratch.

Multi-Camera Arrays with Non-Telescopic Paraxial Optics As noted previously, the cameras in a multi-camera system 100 can support small FOVs (paraxial range (5-10 deg HFOV)), but not necessarily be telescopic. For example, such systems can be optimized to image close, both near and far, with short focal length (e.g. <50 mm) lenses, for example to image within imaging distances or ranges from a minimum to maximum imaging distance in object space, spanning 10-1000 ft or 20-2500 ft. Such cameras can be useful for applications with modest resolution specifications, such as when using low resolution image sensors to reduce cost or because of data path constraints (e.g., with VGA or SVGA sensors) or because of technology limitations (e.g., LWIR). In such systems, reducing the imaged FOV can help modestly increase the camera resolution. Notably, in such systems, it can be desirable to use low-parallax lens designs, like those of FIGS. 1A,B, so the front lens element can have a polygonal truncation, and the mechanical seams between adjacent cameras can be reduced. This type of system can be appropriate for low sWaP surveillance, IR night vision, agricultural monitoring, or on-board drone imaging applications.

What is claimed is:

1. An imaging system for producing a substantially parallax-free image, the imaging system comprising:
   a first imaging unit including a first camera module configured to capture a first image of a scene in a first field of view;
   a second imaging unit including a second camera module configured to capture a second image of the scene in a second field of view, wherein first imaging unit and the second imaging unit are arranged in a side-by-side configuration such that a first field of view of and the second field of view partially overlap;
   one or more processors; and
   memory storing non-transitory computer-readable media storing instructions, the instructions, when executed, causing the one or more processors to perform operations comprising:
      determining intrinsic and extrinsic parameters of the first camera module and the second camera module;
      establishing, for individual pixels of the first imaging unit and the second imaging unit, a per-pixel mapping from image coordinates to a three-dimensional space, including determining an instantaneous field-of-view (IFOV) direction vector for each pixel such that each pixel corresponds to a principal ray in object space;
      selecting, for the first imaging unit, a first core field-of-view region comprising a contiguous set of pixels having corresponding IFOV direction vectors that together define a stencil of principal rays that are substantially parallel to a stencil of principal rays defined by a second core field-of-view region from the second imaging unit, the first core field-of-view region comprising a low parallax region within the first field of view;
      selecting, from the first image, a first series of pixels in a first extended field-of-view region beyond the first core field-of-view region and, from the second image, a second series of pixels in a second extended field-of-view region beyond the second core field of view region, wherein the first series of pixels and the second series of pixels are mapped to three-dimensional space, enabling blending of IFOV direction vectors from the first imaging unit and the second imaging unit to eliminate gaps; and
      blending the first core field-of-view region and the first extended field-of-view pixel sets and the second core field-of-view region and the second extended field-of-view pixel sets based on their three-dimensional mappings, thereby forming a seamless panoramic image with minimal or substantially no visible parallax and no coverage gaps along a boundary between the first imaging unit and the second imaging unit.

2. The system of claim 1, wherein the first core field-of-view region or the second core field-of-view region is defined so that any residual misalignment corresponds to less than a threshold pixel offset in a 3D-reprojected image space, thereby reducing parallax artifacts at the boundaries.

3. The system of claim 1, wherein the operations further comprise dynamically adjusting a boundary of at least one of the first core field-of-view region or the second core field-of-view region based on updated calibration data or scene content to maintain minimal parallax as environmental conditions or camera positions change.

4. The system of claim 1, the operations further comprising storing and updating intrinsic parameters and extrinsic parameters so that any camera drift or perturbation may be corrected before blending.

5. The system of claim 4, wherein the intrinsic parameters comprise at least one of focal length, principal point, or lens distortion coefficients and the extrinsic parameters comprise at least one of rotation or translation.

6. The system of claim 1, wherein a first optical axis of the first camera module and a second optical axis of the second camera module are oriented to cover a portion of a panoramic environment, wherein the partial overlap between the first field-of-view and the second field-of-view are configured to provide enough redundancy for parallax correction via core field-of-view the selecting and the blending.

7. The system of claim 1, the operations further comprising using a 3D reprojection and pixel-level warping to align the overlapping regions from the first imaging unit and the second imaging unit, thereby ensuring that features from object space map to consistent image positions across camera boundaries.

8. The system of claim 1, wherein determining the pixel value comprises:
   determining a weighted average of a first value of a first pixel in the first portion of the first image and a second value of a second pixel in the second portion of the second image,
   wherein the pixel value associated with the pixel location is based on the weighted average.

9. The system of claim 8, wherein weights of the weighted average are based on a first distance between the first pixel and an edge of the overlap region and a second distance between the second pixel and the edge of the overlap region.

10. The system of claim 8, wherein weights of the weighted average are based on a first distance between the first pixel and a center pixel of the first image and a second distance between the second pixel and a center pixel of the second image.

11. The system of claim 1, wherein determining the pixel value comprises:
   determining a first weight corresponding to the first image and a second weight corresponding to the second image; and sampling pixel values from the first image and the second image based on the first weight and the second weight, wherein the pixel value is based on the sampled pixel values.

12. A method of forming a substantially parallax-free panoramic image using camera modules, the method comprising:
arranging a plurality of camera modules such that their respective captured fields of view partially overlap;
calibrating the camera modules to determine intrinsic and extrinsic parameters and to establish a per-pixel mapping between image coordinates and three-dimensional coordinates;
selecting, based on the calibrating, core field-of-view regions within the respective captured fields of view, the core field-of-view regions excluding peripheral areas prone to parallax errors; and
blending the core field-of-view regions from the calibrated camera modules into a composite panoramic image using the three-dimensional mappings and controlled overlaps, thereby producing a substantially parallax-free panoramic image.

13. The method of claim 12, further comprising performing post-capture adjustments to boundaries of the core field-of-view regions in response to detected parallax or misalignment to maintain a high-quality stitch-free panoramic image.

14. The method of claim 12, wherein the calibrating and the blending are iteratively refined by comparing features in the overlapping regions, adjusting camera orientation parameters, and updating pixel-level mappings to continually improve parallax reduction over time.

15. The method of claim 12, further comprising:
determining, based on a first location of the first pixel values and a second location of the second pixel values, a first weight corresponding to the first image and a second weight corresponding to the second image,
wherein determining the pixel value comprises one of:
determining, based on the first weight and the second weight, a weighted average of a portion of the first pixel values and the second pixel values, or
determining, based on the first weight and the second weight, a stochastic sampling of the first pixel values and the second pixel values.

16. A multi-camera imaging system for producing a substantially parallax-free image, comprising:
a plurality of imaging units, individual of the plurality of imaging units including a camera module comprising lens elements mounted in a lens barrel and configured to capture an image of a scene, wherein individual of the plurality of imaging units has a core field of view and a larger extended field of view, and wherein the plurality of imaging units are arranged in a side-by-side configuration such that the extended fields of view of adjacent imaging units partially overlap;
mechanical features provided to connect and align adjacent lens barrels to maintain the imaging units in the side-by-side configuration, the mechanical features including at last one position measurement sensor to measure relative changes in distance between adjacent lens barrels in response to external perturbations;
a calibration module configured to determine intrinsic and extrinsic parameters of the camera module of the individual of the plurality of imaging units and to establish a per-pixel mapping from image coordinates to a three-dimensional space; and
an image processing module configured to select, for individual of the plurality of imaging units, the field-of-view region within a captured image,
wherein:
the image processing module blends the field-of-view from adjacent imaging units together, using the three-dimensional mapping data and the overlapping portions, to produce a seamless panoramic image with minimal or substantially no visible parallax across a boundary between adjacent core field-of-view regions, and
the blending is temporally modified in response to at least some of the measured position changes between adjacent lens barrels resulting from the external perturbations.

17. The multi-camera system of claim 16, wherein the calibration module provides intrinsic or extrinsic calibration modifications in response to the at least some of the measured position changes between adjacent lens barrels.

18. The multi-camera system of claim 16, wherein the blending modifications and the calibration modifications are implemented on different time intervals.

19. The multi-camera system of claim 16, wherein the position sensors are capacitive.

20. The multi-camera system of claim 16, wherein the image capture module is further configured to dynamically adjust a boundary of the core field-of-view region based on updated calibration data or scene content to maintain minimal parallax as environmental conditions or camera positions change.

* * * * *